United States Patent [19]
Jones et al.

[11] Patent Number: 5,596,517
[45] Date of Patent: Jan. 21, 1997

[54] METHOD AND ARRANGEMENT FOR TRANSFORMATION OF SIGNALS FROM A FREQUENCY TO A TIME DOMAIN

[75] Inventors: Anthony M. Jones; Kevin D. Dewar, both of Bristol; Martin W. Sotheran, Dursley, all of Great Britain

[73] Assignee: Discovision Associates, Irvine, Calif.

[21] Appl. No.: 400,722

[22] Filed: Mar. 7, 1995

Related U.S. Application Data

[62] Division of Ser. No. 82,087, Jun. 24, 1993, Pat. No. 5,479,364.

[30] Foreign Application Priority Data

Jun. 26, 1992 [EP] European Pat. Off. ............ 92305927

[51] Int. Cl.$^6$ ..................................................... G06F 7/38
[52] U.S. Cl. ............................................................ 364/725
[58] Field of Search .................................. 364/752, 725; 371/572

[56] References Cited

U.S. PATENT DOCUMENTS

| | | | |
|---|---|---|---|
| 3,676,802 | 7/1972 | Murphree et al. | 364/7.52 |
| 4,829,465 | 5/1989 | Knauer et al. | 364/725 |
| 4,831,440 | 5/1989 | Borgers et al. | 358/133 |
| 4,912,668 | 3/1990 | Aubie et al. | 364/725 |
| 5,053,985 | 10/1991 | Friedlander et al. | 364/725 |
| 5,107,345 | 4/1992 | Lee | 358/432 |
| 5,146,326 | 9/1992 | Hasegawa | 358/135 |
| 5,168,375 | 12/1992 | Reisch et al. | 358/432 |
| 5,189,526 | 2/1993 | Sasson | 358/432 |
| 5,191,548 | 3/1993 | Balkanski et al. | 364/725 |
| 5,202,847 | 4/1993 | Bolton et al. | 364/725 |
| 5,249,146 | 9/1993 | Uramoto et al. | 364/725 |
| 5,253,078 | 10/1993 | Balkanski et al. | 358/426 |
| 5,276,784 | 1/1994 | Ohki | 395/127 |
| 5,278,646 | 1/1994 | Civanlar et al. | 358/133 |
| 5,299,025 | 3/1994 | Shirasawa | 358/400 |
| 5,301,032 | 4/1994 | Hong et al. | 358/261.2 |
| 5,301,136 | 4/1994 | McMillan et al. | 364/725 |
| 5,301,242 | 4/1994 | Gonzales et al. | 382/56 |
| 5,309,527 | 5/1994 | Ohki | 382/56 |
| 5,481,555 | 1/1996 | Wade et al. | 371/57.2 |

FOREIGN PATENT DOCUMENTS

| | | |
|---|---|---|
| 0572262 | 1/1993 | European Pat. Off. . |
| 0572263 | 1/1993 | European Pat. Off. . |

*Primary Examiner*—Tan V. Mai
*Attorney, Agent, or Firm*—Ronald J. Clark; Robert T. Braun; Arthur S. Bickel

[57] ABSTRACT

An IDCT, or Inverse Discrete Cosine Transform, method decimates a 2-D IDCT into two 1-D IDCT operations and then operates separately on the even and odd pixel input words. In a common processing step, selected input values are passed directly to output adders and subtractors, while others are multiplied by constant, scaled cosine values. In a pre-common processing step, the lowest-order odd input word is pre-multiplied by $\sqrt{2}$, and the odd input words are summed pairwise before processing in a common processing step. In a post-common processing step, intermediate values corresponding to the processed odd input words are multiplied by predetermined coefficients to form odd resultant values. After calculation of the even and odd resultant values, the high-order and low-order outputs are formed by simple subtraction/addition, respectively, of the odd resultant values from/with the even resultant values. The input values are preferably scaled upward by a factor of $\sqrt{2}$. Selected bits of some intermediate resulting data words are optionally adjusted by forcing these bits to either "1" or "0". The IDCT system includes a pre-common processing circuit (PREC), a common processing circuit (CBLK), and a post-common processing circuit (POSTC), which perform the necessary operations in the respective steps. The system also includes a controller (CNTL) to generate signals to control the loading of system latches and, preferably, to time-multiplex the application of the even and odd input words to latches in the pre-common circuit.

41 Claims, 14 Drawing Sheets

METHOD AND ARRANGEMENT FOR TRANSFORMATION OF SIGNALS FROM A FREQUENCY TO A TIME DOMAIN

This is a divisional of application Ser. No. 08/082,087 filed on Jun. 24, 1993, U.S. Pat. No. 5,479,364.

BACKGROUND OF THE INVENTION

1. Field of the Invention

This invention relates to a method for the transformation of signals from a frequency to a time representation, as well as a digital circuit arrangement for implementing the transformation.

It is a common goal in the area of telecommunications to increase both information content and transmission speed. Each communications medium, however, imposes a limitation on transmission speed, as does the hardware at the transmitting and receiving end that must process the transmitted signals. A telegraph wire is, for example, typically a much faster medium for transmitting information than the mail is, even though it might be faster to type and read a mailed document than to tap it out on a telegraph key.

The method of encoding transmitted information also limits the speed at which information can be conveyed. A long-winded telegraph message will, for example, take longer to convey than a succinct message with the same information content. The greatest transmission and reception speed can therefore be obtained by compressing the data to be transmitted as much as possible, and then, using a high-speed transmission medium, processing the data at both ends as fast as possible, which often means the reduction or elimination of "bottlenecks" in the system.

One application in which it is essential to provide high-speed transmission of large amounts of data is in the field of digital television. Whereas conventional television systems use analog radio and electrical signals to control the luminance and color of picture elements ("pixels") in lines displayed on a television screen, a digital television transmission system generates a digital representation of an image by converting analog signals into binary "numbers" corresponding to luminance and color values for the pixels. Modern digital encoding schemes and hardware structures typically enable much higher information transmission rates than do conventional analog transmission systems. As such, digital televisions are able to achieve much higher resolution and much more life-like images than their conventional analog counterparts. It is anticipated that digital television systems, including so-called High-Definition TV (HDTV) systems, will replace conventional analog television technology within the next decade in much of the industrialized world. The conversion from analog to digital imaging, for both transmission and storage, will thus be similar to the change-over from analog audio records to the now ubiquitous compact discs (CD's).

In order to increase the general usefulness of digital image technology, standardized schemes for encoding and decoding digital images have been adopted. One such standardized scheme is known as the JPEG standard and is used for still pictures. For moving pictures, there are at present two standards—MPEG and H.261—both of which carry out JPEG-like procedures on each of the sequential frames of the moving picture. To gain advantage over using JPEG repeatedly, MPEG and H.261 operate on the differences between subsequent frames, taking advantage of the well-known fact that the difference, that is the movement, between frames is small; it thus typically takes less time or space to transmit or store the information corresponding to the changes rather than to transmit or store equivalent still-picture information as if each frame in the sequence were completely unlike the frames closest to it in the sequence.

For convenience, all the current standards operate by breaking an image or picture into tiles or blocks, each block consisting of a piece of the picture eight pixels wide by eight pixels high. Each pixel is then represented by three (or more) digital numbers known as "components" of that pixel. There are many different ways of breaking a colored pixel into components, for example, using standard notation, YUV, $YC_rC_b$, RGB, etc. All the conventional JPEG-like methods operate on each component separately.

It is well known that the eye is insensitive to high-frequency components (or edges) in a picture. Information concerning the highest frequencies can usually be omitted altogether without the human viewer noticing any significant reduction in image quality. In order to achieve this ability to reduce the information content in a picture by eliminating high-frequency information without the eye detecting any loss of information, the 8-by-8 pixel block containing spatial information (for example the actual values for luminance) must be transformed in some manner to obtain frequency information. The JPEG, MPEG and H.261 standards all use the known Discrete Cosine Transform to operate on the 8-by-8 spatial matrix to obtain an 8-by-8 frequency matrix.

As described above, the input data represents a square area of the picture. In transforming the input data into the frequency representation, the transform that is applied must be two-dimensional, but such two-dimensional transforms are difficult to compute efficiently. The known, two-dimensional Discrete Cosine Transform (DCT) and the associated Inverse DCT (IDCT), however, have the property of being "separable". This means that rather than having to operate on all 64 pixels in the eight-by-eight pixel block at one time, the block can first be transformed row-by-row into intermediate values, which are then transformed column-by-column into the final transformed frequency values.

A one-dimensional DCT of order N is mathematically equivalent to multiplying two N-by-N matrices. In order to perform the necessary matrix multiplication for an eight-by-eight pixel block, 512 multiplications and 448 additions are required, so that 1,024 multiplications and 896 additions are needed to perform the full 2-dimensional DCT on the 8-by-8 pixel block. These arithmetic operations, and especially multiplication, are complex and slow and therefore limit the achievable transmission rate; they also require considerable space on the silicon chip used to implement the DCT.

The DCT procedure can be rearranged to reduce the computation required. There are at present two main methods used for reducing the computation required for the DCT, both of which use "binary decimation." The term "binary decimation" means that an N-by-N transform can be computed by using two N/2-by-N/2 transformations, plus some computational overhead whilst arranging this. Whereas the eight-by-eight transform requires 512 multiplications and 448 additions, a four-by-four transform requires only 64 multiplications and 48 additions. Binary decimation thus saves 384 multiplications and 352 additions and the overhead incurred in performing the decimation is typically insignificant compared to this reduction in computation.

At present, the two main methods for binary decimation were developed Byeong Gi Lee ("A New Algorithm to Compute the DCT", IEEE Transactions on Acoustics, Speech and Signal Processing, Vol. Assp 32, No. 6, p. 1243, December 1984), and Wen-Hsiung Chen ("A Fast Computational Algorithm for the DCT", Wen-Hsiung Chen, C. Harrison Smith, S. C. Pralick, IEEE Transactions on Communications, Vol. Com 25, No. 9, p. 1004, September 1977.) Lee's method makes use of the symmetry inherent in the definition of the inverse DCT and by using simple cosine identities it defines a method for recursive binary decimation. The Lee approach is only suitable for the IDCT. The Chen method uses a recursive matrix identity that reduces the matrices into diagonals only. This method provides easy binary decimation of the DCT using known identities for diagonal matrices.

A serious disadvantage of the Lee and Chen methods is that they are unbalanced in respect of when multiplications and additions must be performed. Essentially, both of these methods require that many additions be followed by many multiplications, or vice versa. When implementing the Lee or Chen methods in hardware, it is thus not possible to have parallel operation of adders and multipliers. This reduces their speed and efficiency, since the best utilization of hardware is when all adders and multipliers are used all the time.

An additional disadvantage of such known methods and devices for performing DCT and IDCT operations is that it is usually difficult to handle the so-called normalization coefficient, and known architectures require adding an extra multiplication at a time when all the multipliers are being used.

Certain known methods for applying the forward and inverse DCT to video data are very simple and highly efficient for a software designer who need not be concerned with the layout of the semiconductor devices that must perform the calculations. Such methods, however, often are far too slow or are far too much complex in semiconductor architecture and hardware interconnections to perform satisfactorily at the transmission rate desired for digital video.

Yet another shortcoming of existing methods and hardware structures for performing DCT and IDCT operations on video data is that they require floating-point internal representation of numerical values. To illustrate this disadvantage, assume that one has a calculator that is only able to deal with three-digit numbers, including digits to the right of the decimal point (if any). Assume further that the calculator is to add the numbers 12.3 and 4.56. (Notice that the decimal point is not fixed relative to the position of the digits in these two numbers. In other words, the decimal point is allowed to "float".) Since the calculator is not able to store the four digits required to fully represent the answer 16.86, the calculator must reduce the answer to three digits either by truncating the answer by dropping the right-most "6", yielding an answer of 16.8, or it must have the necessary hardware to round the answer up to the closest three-digit approximation 16.9.

As this very simple example illustrates, if floating-point arithmetic is assumed or required, one must either accept a loss of precision or include highly complicated and space-wasting circuitry to minimize rounding error. Even with efficient rounding circuitry, however, the accumulation and propagation of rounding or truncation errors may lead to unacceptable distortion in the video signals. This problem is even greater when the methods for processing the video signals require several multiplications, since floating-point rounding and truncation errors are typically even greater for multiplication than for addition.

A much more efficient DCT/IDCT method and hardware structure would ensure that the numbers used in the method could be represented with a fixed decimal point, but in such a way that the full dynamic range of each number could be used. In such a system, truncation and rounding errors would either be eliminated or at least greatly reduced.

In the example above, if the hardware could handle four digits, no number greater than 99.99 were ever needed, and every number had the decimal point between the second and third places, then the presence of the decimal point would not affect calculations at all, and the arithmetic could be carried out just as if every number were an integer: the answer 1230+0456=1686 would be just as clear as 12.30+ 4.56=16.86, since one would always know that the "1686" should have a decimal point between the middle "6" and "8". Alternatively, if numbers (constant or otherwise) are selectively scaled or adjusted so that they all fall within the same range, each number in the range could also be accurately and unambiguously represented as a set of integers.

One way of reducing the number of multipliers needed is simply to have a single multiplier that is able to accept input data from different sources. In other words, certain architectures use a single multiplier to perform the multiplications required in different steps of the DCT or IDCT calculations. Although such "crossbar switching" may reduce the number of multipliers required, it means that large, complicated multiplexer structures must be included instead to select the inputs to the multiplier, to isolate others from the multiplier, and to switch the appropriate signals from the selected sources to the inputs of the multiplier. Additional large-scale multiplexers are then also required to switch the large number of outputs from the shared multipliers to the appropriate subsequent circuitry. Crossbar switching or multiplexing is therefore complex, is generally slow (because of the extra storage needed), and costs significant area in a final semiconductor implementation.

Yet another drawback of existing architectures, including the "crossbar switching", is that they require general purpose multipliers. In other words, existing systems require multipliers for which both inputs are variable. As is well known, implementations of digital multipliers typically include rows of adders and shifters such that, if the current bit of a multiplier word is a "one", the value of the multiplicand is added into the partial result, but not if the current bit is a "zero". Since a general purpose multiplier must be able to deal with the case in which every bit is a "1", a row of adders must be provided for every bit of the multiplier word.

By way of an example, assume that data words are 8 bits wide and that one wishes to multiply single inputs by 5. An 8-bit representation of the number 5 is 00000101. In other words, digital multiplication by 5 requires only that the input value be shifted to the left two places (corresponding to multiplication by 4) and then added to its un-shifted value. The other six positions of the coefficient have bit values of "0", so they would not require any shifting or addition steps.

A fixed-coefficient multiplier, that is, in this case, a multiplier capable of multiplying only by five, would require only a single shifter and a single adder in order to perform the multiplication (disregarding circuitry needed to handle carry bits). A general purpose multiplier, in contrast, would require shifters and adders for each of the eight positions, even though six of them would never need to be used. As the example illustrates, fixed coefficients can simplify the multipliers since they allow the designer to eliminate rows of adders that correspond to zeros in the coefficient, thus saving silicon area.

SUMMARY OF THE INVENTION

Various aspects of the invention are exemplified by the attached claims.

In a IDCT method according to a further aspect of the invention, a one-dimensional IDCT for each N-row and N-column of N-by-N pixel blocks is decimated and a 1-D IDCT is performed separately on the N/2 even-numbered pixel input words and the N/2 odd-numbered pixel input words.

In a preferred embodiment, N=8 according to the JPEG standard. The two-dimensional IDCT result is then obtained by performing two one-dimensional IDCT operations in sequence (with an intermediate reordering—transposition—of data).

In a common processing step, for N=8, a first pair of input values is passed without need for multiplication to output adders and subtractors. Each of a second pair of input values is multiplied by each of two constant-coefficient values corresponding to two scaled cosine values. No other multiplications and only one subtraction and one addition are required in the common processing step. The second pair is then added or differenced pairwise with the first pair of input values to form even or odd resultant values.

In a pre-common processing stage, the lowest-order odd input word is pre-multiplied by $\sqrt{2}$, and the odd input words are summed pairwise before processing in a common processing block. In a post-common processing stage, intermediate values corresponding to the processed odd input words are multiplied by predetermined constant coefficients to form odd resultant values.

After calculation of the even and odd resultant values, the N/2 high-order outputs are formed by simple subtraction of the odd resultant values from the even resultant values, and the N/2 low-order outputs are formed by simple addition of the odd resultant values and the even resultant values.

For both the DCT (at the transmission end of a video processing system) and the IDCT (at the receiving end, which incorporates one or more of the various aspects of the invention), the values are preferably deliberately scaled upward by a factor of $\sqrt{2}$. After the DCT/IDCT operations are performed, the resulting values may then be scaled downward by a factor of two by a simple binary right shift. This deliberate, balanced, upward scaling eliminates several multiplication steps that are required according to conventional methods.

According to another aspect of the method, selected bits of constant coefficients or intermediate resulting data words are rounded or adjusted by predetermined setting of selected bits to either "1" or "0".

Two-dimensional transformation of pixel data is carried out by a second, identical 1-D operation on the output values from the first 1-D IDCT processing steps.

An IDCT system according to yet another aspect of the invention includes a pre-common processing circuit, a common processing circuit, and a post-common processing circuit, in which the pre-common, common, and post-common processing calculations are performed on input data words. A supervisory controller generates control signals to control the loading of various system latches; preferably, to serially time-multiplex the application of the N/2 even- and N/2 odd-numbered input words to input latches of the pre-common block; to direct addition of the even and odd resultant values to form and latch low-order output signals and to direct subtraction of the odd resultant values from the even resultant values to form and latch the high-order output signals; and to sequentially control internal multiplexers.

Even and odd input words are preferably processed in separate passes through the same processing blocks. Input data words are preferably (but not necessarily) latched not in strictly ascending or descending order, but rather in an order enabling an efficient "butterfly" structure for data paths.

At least the common processing circuit may be configured as a pure-logic circuit, with no clock or control signals required for its proper operation, as may be other processing blocks depending on the particular application.

No general-purpose multipliers (with two variable inputs) are required; rather constant coefficient multipliers are included throughout the preferred embodiment. Furthermore, fixed-point integer arithmetic devices are included in the preferred embodiment for all required arithmetic operations.

It will be apparent that certain embodiments of the invention can be so designed as to provide a method and system for performing IDCT transformation of video data with one or more of the following features:

(1) constant use of all costly arithmetic operations;

(2) in order to reduce the silicon area needed to implement the IDCT, there are a small number of storage elements (such as latches), preferably no more than required for efficient pipelining of the architecture, coupled with a small number of constant coefficient multipliers rather than general purpose multipliers that require extra storage elements;

(3) operations are arranged so that each arithmetic operation does not need to use sophisticated designs; for example, if known "ripple adders" are used, these would sufficient time to "resolve" (see below) or produce their answers; if operations are arranged in such a way that other devices preceding such a ripple adder in the data path are to be held idle while waiting for the adder to finish, then rearranging operations to avoid this delay should lead to greater throughput and efficiency;

(4) one is able to generate results in a natural order;

(5) no costly, complex, crossbar switching need be required;

(6) the architecture is able to support much faster operations; and (7) the circuitry used to control the flow of data through the transform hardware can be small in area.

BRIEF DESCRIPTION OF THE DRAWING

For a better understanding of the invention and to show how the same may be carried into effect, reference will now be made, by way of example, to the accompanying drawings, in which.

DESCRIPTION OF THE PREFERRED EMBODIMENT

Theoretical Background of the Invention

Figure 1:
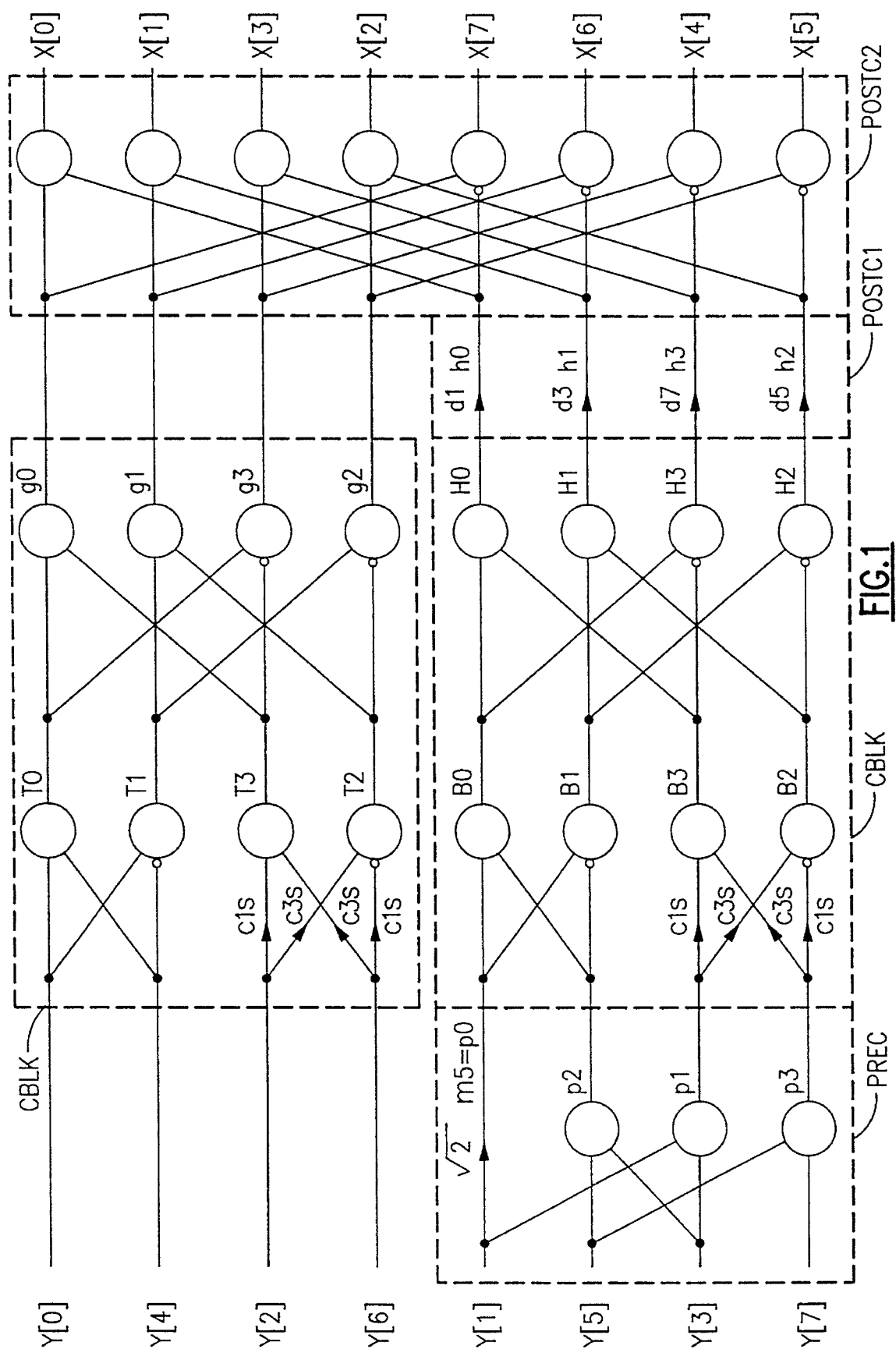
FIG. 1 is a simplified illustration of basic steps in a method according to the invention for performing the IDCT on input data.

In order to understand the purpose and function of the various components and the advantages of the signal processing method used in the IDCT system according to the invention, it is helpful to understand the system's theoretical basis.

Separability of a Two-Dimensional IDCT

The mathematical definition of a two-dimensional forward discrete cosine transform (DCT) for an N×N block of pixels is as follows, where $Y(j,k)$ are the pixel frequency values corresponding to the pixel absolute values $X(m,n)$:

$$(E1): Y(j,k) = \frac{2}{N} c(j)c(k) \sum_{n=0}^{N-1} \sum_{m=0}^{N-1} X(m,n) \cos\left[\frac{(2m+1)j\pi}{2N}\right] \cos\left[\frac{(2n+1)k\pi}{2N}\right]$$

where $j,k = 0, 1, \ldots, N-1$ and $$c(j), c(k) = \begin{cases} 1/\sqrt{2} & \text{for } j,k = 0 \\ 1 & \text{otherwise} \end{cases}$$

The term $2/N$ governs the dc level of the transform, and the coefficients $c(j)$, $c(k)$ are known as normalization factors.

The expression for the corresponding inverse discrete cosine transform, that is for the IDCT, is as follows:

$$(E2): X(m,n) = \frac{2}{N} \sum_{j=0}^{N-1} \sum_{k=0}^{N-1} c(j)c(k)Y(j,k)\cos\left[\frac{(2m+1)j\pi}{2N}\right] \cos\left[\frac{(2n+1)k\pi}{2N}\right]$$

where $j,k = 0, 1, \ldots, N-1$ and $$c(j), c(k) = \begin{cases} 1/\sqrt{2} & \text{for } j,k = 0 \\ 1 & \text{otherwise} \end{cases}$$

The forward DCT is used to transform spatial values (whether representing characteristics such as luminance directly, or representing differences, such as in the MPEG standard) into their frequency representation. The inverse DCT, as its name implies, operates in the other "direction", that is the IDCT transforms the frequency values back into spatial values.

In the expression E2, note that the cosine functions each depend on only one of the summation indices. The expression E2 can therefore be rewritten as:

$$(E3): X(m,n) = \frac{2}{N} \sum_{j=0}^{N-1} c(j) \cos\left[\frac{(2m+1)j\pi}{2N}\right] \sum_{k=0}^{N-1} c(k)y(j,k)\cos\left[\frac{(2n+1)k\pi}{2N}\right]$$

This is the equivalent of a first one-dimensional IDCT performed on the product of all terms that depend on k and n, followed, after a straightforward standard data transposition, by a second one-dimensional IDCT using as inputs the outputs of the first IDCT operation.

Definition of the 1-D IDCT

A 1-dimensional, N-point IDCT (where N is an even number) is defined by the following expression:

$$(E4): x(k) = \sum_{n=0}^{N-1} c(n) \cdot y(n) \cdot \cos\left[\frac{\pi(2k+1)n}{2N}\right]$$

$k = \{0, 1, \ldots, N-1\}$ where $$c(n) = \begin{cases} 1/\sqrt{2} & \text{for } n = 0 \\ 1 & \text{otherwise} \end{cases}$$

and where $y(n)$ are the N inputs to the inverse transformation function and $x(k)$ are its N outputs. As in the 2-D case, the formula for the DCT has the same structure under the summation sign, but with the normalization constant outside the summation sign and with the x and y vectors switching places in the equation.

Resolution of a 1-D IDCT

As is shown above, the 2-D IDCT can be calculated using a sequence of 1-D IDCT operations separated by a transpose. According to an embodiment, each of these 1-D operations is in turn broken down into sub-procedures that are then exploited to reduce even further the required size and complexity of the semiconductor implementation.

Normalization of coefficients

As is discussed above, an important design goal for IDCT hardware is the reduction of the required number of multipliers that must be included in the circuitry. Most methods for calculating the DCT or IDCT therefore attempt to reduce the number of multiplications needed. According to this embodiment, however, all the input values are deliberately scaled upward by a factor of $\sqrt{2}$. In other words, using the method according to this embodiment, the right-hand side of the IDCT expression (E4) is deliberately multiplied by $\sqrt{2}$.

According to this embodiment, two 1-D IDCT operations are performed in series (with an intermediate transpose) to yield the final 2-D IDCT result. Each of these 1-D operations includes a multiplication by the same $\sqrt{2}$ factor. Since the intermediate transposition involves no scaling, the result of two multiplications by $\sqrt{2}$ in series is that the final 2-D results will be scaled upward by a factor of $\sqrt{2}\cdot\sqrt{2}=2$. To obtain the unscaled value the circuitry need then only divide by two, which, since the values are all represented digitally, can be accomplished easily by a simple right shift of the data. As is made clearer below, the upward scaling by $\sqrt{2}$ in each 1-D IDCT stage and final down-scaling by 2 is accomplished by adders, multipliers, and shifters all within the system's hardware, so that the system places no requirements for scaled inputs on the other devices to which the system may be connected. Because of this, the system is compatible with other conventional devices that operate according to the JPEG or MPEG standards.

Normalization according to this embodiment thus eliminates the need for hardware multipliers within the IDCT semiconductor architecture for at least two $\sqrt{2}$-multiplication operations. As is explained below in greater detail, the single additional multiplication step (upward scaling by $\sqrt{2}$) of the input data in each 1-D operation leads to the elimination of yet other multiplication steps that are required when using conventional methods.

Separation of the 1-D IDCT into High and Low-Order Outputs

Expression E4 can now be evaluated separately for the N/2 low-order outputs (k=0, 1, ..., N/2–1) and the N/2 high-order outputs (k=N/2, N/2+1, ... N). For N=8, this means that one can first transform the inputs to calculate y(0), y(1), y(2), and y(3), and then transform the inputs to calculate y(4), y(5), y(6), and y(7).

Introduce the variable k'=(N–1–k) for the high-order outputs (k=N/2+1, ..., N), so that k' varies from (N/2–1) to 0 as k varies from (N/2+1) to N. For N=8, this means that k'={3,2,1,0} for k={4,5,6,7}. It can then be shown that expression E4 can be divided into the following two sub-expressions E5 (which is the same as E4 except for the interval of summation) and E6:

Low-order outputs:

$$(E5): x(k) = \sum_{n=0}^{N-1} c(n) \cdot y(n) \cdot \cos\left[\frac{\pi(2k+1)n}{2N}\right]$$

where k={0, 1, ..., (N/2–1)}; and where $$c(n) = \begin{cases} 1/\sqrt{2} & \text{for } n = 0 \\ 1 & \text{otherwise} \end{cases}$$

High-order outputs:

$$(E6): x(k) = x(N-1-k') = \sum_{n=0}^{N-1} y(n)(-1)^n \cos\left[\frac{\pi(2k'+1)n}{2N}\right]$$

where k={N, ..., (N/2+1)}→k'={0, 1, ..., (N/2–1)}

(Since c(n)=1 for all high-order terms, c(n) is not included in this expression).

Note that both E5 and E6 have the same structure under the summation sign except that the term $(-1)^n$ changes the sign of the product under the summation sign for the odd-numbered inputs (n odd) for the upper N/2 output values and except that the y(0) term will be multiplied by c(0)=1/$\sqrt{2}$.

Separation of the 1-D IDCT into Even and Odd Inputs

Observe that the single sum in the 1-D IDCT expression E4 can also be separated into two sums: one for the even-numbered inputs (for N=8, y(0), y(2), y(4), and y(6)) and one for the odd-numbered inputs (for N=8, y(1), y(3), y(5), and y(7)). Let g(k) represent the partial sum for the even-numbered inputs and h(k) represent the partial sum for the odd-numbered inputs. Thus:

$$(E7): g(k) = \sum_{n=0}^{\frac{N}{2}-1} c(2n)\cos\left[\frac{\pi(2k+1)2n}{2N}\right] = \sum_{n=0}^{\frac{N}{2}-1} c(2n)y(2n)\cos\left[\frac{\pi(2k+1)n}{2\left(\frac{N}{2}\right)}\right]$$

where k={0, 1, ..., (N/2–1)}; and $$(E8): h(k) = \sum_{n=0}^{\frac{N}{2}-1} y(2n+1)\cos\left[\frac{\pi(2k+1)(2n+1)}{2N}\right]$$

where k={0, 1, ..., (N/2–1)}.

For N=8, observe that the sums in E7 and E8 both are taken over n={0, 1, 2, 3}.

Now recall the known cosine identity:

$2\cdot\cos A\cdot\cos B=\cos(A+B)+\cos(A-B)$, and set $A=\pi(2k+1)/2N$ and $B=\pi(2k+1)(2n+1)/2N$.

One can then multiply both sides of the expression E8 by:

$2\cdot\cos A=1/\{2\cdot\cos[\pi(2k+1)/2N]\}=C_k$.

Note that, since $C_k$ does not depend on the summation index n, it can be moved within the summation sign. Assume then by definition that y(–1)=0, and note that the cosine function for the input y(7) is equal to zero. The expression for h(k) can then be rewritten in the following form:

$$(E9): h(k) = \frac{1}{2\cos\left(\frac{\pi(2k+1)}{2N}\right)} \sum_{n=0}^{\frac{n}{2}-1} [y(2n+1) + y(2n-1)]\cos\left[\frac{\pi(2k+1)n}{2\left(\frac{N}{2}\right)}\right]$$

where k={0, 1, ..., (N/2–1)}.

Note that the "inputs" [y(2n+1)+y(2n–1)] imply that, in calculating h(k), the odd input terms are paired to form N/2 "paired inputs" p(n)=[y(2n+1)+y(2n–1)].

For N=8, the values of p(n) are as follows:

n p(n)
0 y(–1) + y(1) = y(1)    (y(–1) = 0 by definition)
1 y(1) + y(3)
2 y(3) + y(5)
3 y(5) + y(7)

Expression E9 for h(k) can then be represented by the following:

$$(E10): h(k) = C_k \sum_{n=0}^{\frac{N}{2}-1} p(n)\cos\left[\frac{\pi(2k-1)n}{2\left(\frac{N}{2}\right)}\right]$$

where k={0, 1, ..., (N/2–1)}.

Observe now that the cosine term under the summation sign is the same for both g(k) and h(k), and that both have the structure of a 1-D IDCT (compare with expression E5). The result of the IDCT for the odd k terms, that is, for h(k), however, is multiplied by the factor $C_k=1/\{2\cdot\cos[\pi(2k+1)/2N]\}$. In other words, $g(k)$ is an N/2-point IDCT operating on even inputs $y(2n)$ and $h(k)$ is an N/2-point IDCT operating on $[y(2n+1)+y(2n-1)]$ where $y(-1)=0$ by definition.

Now introduce the following identities:

$yn=y(n)$;
$c1=\cos(\pi/8)$;
$c2=\cos(2\pi/8)=\cos(\pi/4)=1/\sqrt{2}$
$c3=\cos(3\pi/8)$;
$d1=1/[2\cdot\cos(\pi/16)]$;
$d3=1/[2\cdot\cos(3\pi/16)]$;
$d5=1/[2\cdot\cos(5\pi/16)]$; and
$d7=1/[2\cdot\cos(7\pi/16)]$.

Further introduce scaled cosine coefficients as follows:

$c1s=\sqrt{2}\cdot\cos(\pi/8)$;
$c3s=\sqrt{2}\cdot\cos(3\pi/8)$;

Using the known evenness ($\cos(-\phi)=\cos(\phi)$) and periodicity ($\cos(\pi-\phi)=-\cos(\phi)$) of the cosine function, expressions E7 and E8 can then be expanded for N=8 to yield (recall also that $c(0)$ is $1/\sqrt{2}$):

$$
\begin{aligned}
g(0) &= 1/\sqrt{2} \cdot y0 + y2c1 + y4c2 + y6c3 \\
&= 1/\sqrt{2} \cdot (y0 + y2 \cdot c1s + y4 + y6 \cdot c3s) \\
g(1) &= 1/\sqrt{2} \cdot y0 + y2c3 - y4c2 - y6c1 \\
&= 1/\sqrt{2} \cdot (y0 + y2 \cdot c3s - y4 - y6 \cdot c1s) \\
g(2) &= 1/\sqrt{2} \cdot y0 - y2c3 - y4c2 + y6c1 \\
&= 1/\sqrt{2} \cdot (y0 - y2 \cdot c3s - y4 + y6 \cdot c1s) \\
g(3) &= 1/\sqrt{2} \cdot y0 - y2c1 + y4c2 - y6c3 \\
&= 1/\sqrt{2} \cdot (y0 - y2 \cdot c1s + y4 - y6 \cdot c3s)
\end{aligned}
$$

and $$
\begin{aligned}
h(0) &= d1 \cdot \{y1 + (y1+y3)c1 + (y3+y5)c2 + (y5+y7)c3\} \\
&= d1/\sqrt{2} \cdot \{\sqrt{2} \cdot y1 + (y1+y3) \cdot c1s + (y3+y5) + (y5+y7) \cdot c3s\} \\
h(1) &= d3 \cdot \{y1 + (y1+y3)c3 + (y3+y5)c2 - (y5+y7)c1\} \\
&= d3/\sqrt{2} \cdot \{\sqrt{2} \cdot y1 + (y1+y3) \cdot c3s - (y3+y5) + (y5+y7) \cdot c1s\} \\
h(2) &= d5 \cdot \{y1 + (y1+y3)c3 + (y3+y5)c2 - (y5+y7)c1\} \\
&= d5/\sqrt{2} \cdot \{\sqrt{2} \cdot y1 + (y1+y3) \cdot c3s + (y3+y5) + (y5+y7) \cdot c1s\} \\
h(3) &= d7 \cdot \{y1 + (y1+y3)c1 + (y3+y5)c2 + (y5+y7)c3\} \\
&= d7/\sqrt{2} \cdot \{\sqrt{2} \cdot y1 + (y1+y3) \cdot c1s + (y3+y5) + (y5+y7) \cdot c3s\}
\end{aligned}
$$

Now recall that, according to this embodiment, all values are scaled upward by a factor of $\sqrt{2}$ for both the DCT and IDCT operations. In other words, according to the embodiment, both $h(k)$ and $g(k)$ are multiplied by this scaling factor. The $g(k)$ and $h(k)$ expressions therefore become:

(E11):
$$
\begin{aligned}
g(0) &= y0 + y2 \cdot c1s + y4 + y6 \cdot c3s \\
g(1) &= y0 + y2 \cdot c3s - y4 - y6 \cdot c1s \\
g(2) &= y0 - y2 \cdot c3s - y4 + y6 \cdot c1s \\
g(3) &= y0 - y2 \cdot c1s + y4 - y6 \cdot c3s
\end{aligned}
$$

and (E12):
$$
\begin{aligned}
h(0) &= d1 \{\sqrt{2} \cdot y1 + (y1+y3) \cdot c1s + (y3+y5) + (y5+y7) \cdot c3s\} \\
h(1) &= d3 \{\sqrt{2} \cdot y1 + (y1+y3) \cdot c3s - (y3+y5) - (y5+y7) \cdot c1s\} \\
h(2) &= d5 \{\sqrt{2} \cdot y1 + (y1+y3) \cdot c3s - (y3+y5) - (y5+y7) \cdot c1s\} \\
h(3) &= d7 \{\sqrt{2} \cdot y1 + (y1+y3) \cdot c1s - (y3+y5) - (y5+y7) \cdot c3s\}
\end{aligned}
$$

Notice that, since $c2=\cos(\pi/4)=1/\sqrt{2}$, multiplication by $\sqrt{2}$ gives a "scaled" c2 value=1. By scaling the expressions (corresponding to upward scaling of the values of the video absolute and frequency values) according to this embodiment, it is thus possible to eliminate the need to multiply by c2 altogether. Furthermore, only two cosine terms need to be evaluated, c1s and c3s, both of which are constant coefficients so that general utility multipliers are not needed. This in turn eliminates the need for the corresponding hardware multiplier in the semiconductor implementation of the IDCT operations.

The similarity in structure of $g(k)$ and $h(k)$ can be illustrated by expressing these sets of equations in matrix form. Let C be the 4×4 cosine coefficient matrix defined as follows:

(E13); $C = \begin{pmatrix} 1 & c1s & 1 & c3s \\ 1 & c3s & -1 & -c1s \\ 1 & -c3s & -1 & c1s \\ 1 & -c1s & 1 & -c3s \end{pmatrix}$ Then;

(E14); $\begin{pmatrix} g(0) \\ g(1) \\ g(2) \\ g(3) \end{pmatrix} = C \cdot \begin{pmatrix} y0 \\ y2 \\ y4 \\ y6 \end{pmatrix}$ and (E15): $\begin{pmatrix} h(0) \\ h(1) \\ h(2) \\ h(3) \end{pmatrix} = D \cdot C \cdot \begin{pmatrix} \sqrt{2} \cdot y1 \\ y1+y3 \\ y3+y5 \\ y5+y7 \end{pmatrix}$ where D=diag[d1, d3, d5, d7]=the 4×4 matrix with d1, d3, d5 and d7 along the diagonal and with all other elements equal to zero. As E14 and E15 show, the procedures for operating on even-numbered inputs to get $g(k)$ and for operating on the odd-numbered inputs to get $h(k)$ both have the common step of multiplication by the cosine coefficient matrix C. To get $h(k)$, however, the inputs must first be pairwise summed (recalling that $y(-1)=0$ by definition), $y(1)$ must be premultiplied by $\sqrt{2}$, and the result of the multiplication by C must be multiplied by D.

As the expressions above also indicate, the N-point, 1-D IDCT (see E4) can be split into two N/2-point, 1-D IDCTs, each involving common core operations (under the summation sign) on the N/2 odd (grouped) and N/2 even input values. The expressions above yield the following simple structure for the IDCT as implemented in this embodiment:

Low-order outputs (for N=8, outputs k={0,1,2,3}):
(E16): $y(k)=g(k)+h(k)$

High-order outputs (for N=8, outputs k={4,5,6,7}):
(E17): $y(k)=y(N-1-k')=g(k')-h(k')$ Note that g(k) operates directly on even input values to yield output values directly, whereas h(k') involves grouping of input values, as well as multiplication by the values d1, d3, d5 and d7.

As always, the designer of an IDCT circuit is faced with a number of trade-offs, such as size versus speed and greater number of implemented devices versus reduced interconnection complexity. For example, it is often possible to improve the speed of computation by including more, or more complicated, devices on the silicon chip, but this obviously makes the implementation bigger or more complex. Also, the area available or desired on the IDCT chip may limit or preclude the use of sophisticated, complicated, designs such as "look-ahead" adders.

Standards of Accuracy

Assuming infinite precision and accuracy of all calculations, and thus unlimited storage space and calculation time, the image recreated by performing the IDCT on DCT-transformed image data would reproduce the original image perfectly. Of course, such perfection is not to be had using existing technology.

In order to achieve some standardization, however, IDCT systems are at present measured according to a standardized method put forth by the Comite Consultatif International Telegraphique et Telephonique ("CCITT") in "Annex 1 of CCITT Recommendation H.261—Inverse Transform Accuracy Specification". This test specifies that sets of 10,000 8-by-8 blocks containing random integers be generated. These blocks are then DCT and IDCT transformed (preceded or followed by predefined rounding, clipping and arithmetic operations) using predefined precision to produce 10,000 sets of 8-by-8 "reference" IDCT output data.

When testing an IDCT implementation, the CCITT test blocks are used as inputs. The actual IDCT transformed outputs are then compared statistically with the known "reference" IDCT output data. Maximum values are specified for the IDCT in terms of peak, mean, mean square and mean mean error of blocks as a whole and individual elements. Furthermore, the IDCT must produce all zeros out if the corresponding input block contains all zeros, and the IDCT must meet the same standards when the sign of all input data is changed. Implementations of the IDCT are said to have acceptable accuracy only if their maximum errors do not exceed the specified maximum values when these tests are run.

Other known standards are those of the Institute of Electrical and Electronic Engineers ("IEEE"), in "IEEE Draft Standard Specification for the Implementation of 8 by 8 Discrete Cosine Transform", P1180/D2, Jul. 18, 1990; and Annex A of "8 by 8 Inverse Discrete Cosine Transform", ISO Committee Draft CD 11172-2. These standards are essentially identical to the CCITT standard described above.

Hardware Implementation

FIG. 1 is a simplified block diagram that illustrates the data flow of the IDCT method according to one embodiment (although the hardware structure, as is illustrated and explained below, is made more compact and efficient). In FIG. 1, the inputs to the system such as Y[0] and Y[4], and the outputs from the system, such as X[3] and X[6], are shown as being conveyed on single lines. It is to be understood that each of the single-drawn lines in FIG. 1 represents several conductors in the form of data buses to convey, preferably in parallel, the several-bit wide data words that each input and output corresponds to.

In FIG. 1, large open circles represent two-input, single-output adders, whereby a small circle at the connection point of an input with the adder indicates that the complement of the corresponding input word is used. Adders with such a complementing input thus subtract the complemented input from the non-complemented input. For example, although the output T0 from the upper left adder will be equal to Y[0]+Y[4] (that is, T0=Y0+Y4, the adder with the output T1 forms the value Y0+(−1)·Y4–Y0–Y4. Adders with a single complementing input can therefore be said to be differencing components.

Also in FIG. 1, constant-coefficient multipliers are represented by solid triangles in the data path. For example, the input Y1 passes through a √2 multiplier before entering the adder to form B0. Consequently, the intermediate value T3=Y2·T3=Y2·c1s+Y6·c3s, and the intermediate value B2=p1·c3s−p3·c1s=(Y1+Y3)·c3s−(Y5+Y7)·c1s. By performing the indicated additions, subtractions, and multiplications, one will see that the illustrated structure implements the expressions E11 and E12 for g(0) to g(3) and h(0) to h(3).

FIG. 1 illustrates an important advantage of the embodiment. As FIG. 1 shows, the structure is divided into four main regions: a pre-common block PREC that forms the paired inputs p(k) and multiplies the input Y(1) by √2; a first post-common block POSTC1 that includes four multipliers for the constants d1, d3, d5, d7 (see expression E12); a second post-common block POSTC2 that sums the g0 to g3 terms and the h0 to h3 terms for the low order outputs, and forms the difference of the g0 to g3 terms and the h0 to h3 terms for the high-order outputs (See expressions E16 and E17); and a common block CBLK (described below).

As expressions E14 and E15 indicate, by manipulating the input signals according to the embodiment, processing both the even-numbered and odd-numbered input signals involves a common operation represented by the matrix C. This can be seen in FIG. 1, in which the common block CBLK is included in both the even and odd data paths. In the processing circuitry according to the embodiment, the common operations performed on the odd- and even-numbered inputs are carried out by a single structure, rather than the duplicated structure illustrated in FIG. 1.

To understand the method of operation and the advantages of certain digital structures used in the embodiment, it is helpful to understand what a "carry word" is, and how it is generated.

In performing the two most common arithmetic operations, addition and multiplication, digital devices need to deal with the problem of "carry bits". As a simple example, note that the addition of two binary numbers is such that 1+1=0, with a carry of "1", which must be added into the next higher order bit to produce the correct result "10" (the binary representation of the decimal number "2"). In other words, 01+01=00 (the "sum" without carry)+10 (the carry word); adding the "sum" to the "carry word", one gets the correct answer 00+10=10.

As a decimal example, assume that one needs to add the numbers "436" and "825". The common procedure for adding two numbers by hand typically proceeds as follows:

1) Units: "6" plus "5" is "1", with a carry of "1" into the "tens" position—Sum: 1, Carry-In: 0, Carry-Out: 1;

2) Tens: "3" plus "2" is "5", plus the "1" carried from the preceding step, gives "6", with no carry—Sum: 5, Carry-In: 1, Carry-Out: 0

3) Hundreds: "4" plus "8" is "2", with a carry of 1 into the thousands, but with no carry to be added in from the previous step;

Sum: 2, Carry-In: 0, Carry-Out: 1

4) Thousands: "0" plus "0" is "0", plus the "1" carried from the hundreds, gives "1".

Sum: 0, Carry-In: 1, Carry-Out: 0

The answer, "1261", is thus formed by adding the carry-in sum for each position to the sum for the same position, with the carry-in to each position being the carry-out of the adjacent lower-order position. (Note that this implies that the carry-in to the lowest order position is always a "0".) The problem, of course, is that one must wait to add the "4" and "8" in the hundreds place until one knows whether there will be a carry-in from the tens place. This illustrates a "ripple adder", which operates essentially in this way. A ripple adder thus achieves a "final" answer without needing extra storage elements, but it is slower than some other designs.

One such alternative design alternative design is known as "carry-save", in which the sum of two numbers for each position is formed by storing a partial sum or result word (in this example, 0251) and the carry values in a different word (here, 1010). The full answer is then obtained by "resolving" the sum and carry words in a following addition step. Thus, 0251+1010=1261. Note that one can perform the addition for every position at the same time, without having to wait to determine whether a carry will have to be added in, and the carry word can be added to the partial result at any time as long as it is saved.

Since the resolving operations typically require the largest proportion of the time required in each calculation stage, speeding up these operations has a significant effect on the overall operating speed while requiring only a relatively small increase in the size of the transform. Carry-save multipliers thus are usually faster than those that use ripple adders in each row, but this gain in time comes at the cost of greater complexity, since the carry word for each addition in the multiplier must be either stored or passed down to the next addition. Furthermore, in order to obtain the final product of a multiplication, the final partial sum and final carry word will have to be resolved, normally by addition in a ripple adder. Note, however, that only one ripple adder will be needed, so that the time savings are normally proportional to the size of the multiplication that must be performed. Furthermore, note that a carry word may be treated as any other number to be added in and as long as it is added in at some time before the final multiplication answer is needed, the actual addition can be delayed.

In this embodiment, this possibility of delaying resolution is used to simplify the design and increase the throughput of the IDCT circuitry. Also, certain bits of preselected carry words are, optionally, deliberately forced to predetermined values before resolution in order to provide greater expected accuracy of the IDCT result based on a statistical analysis of test runs of the invention on standard test data sets.

Figure 2A:
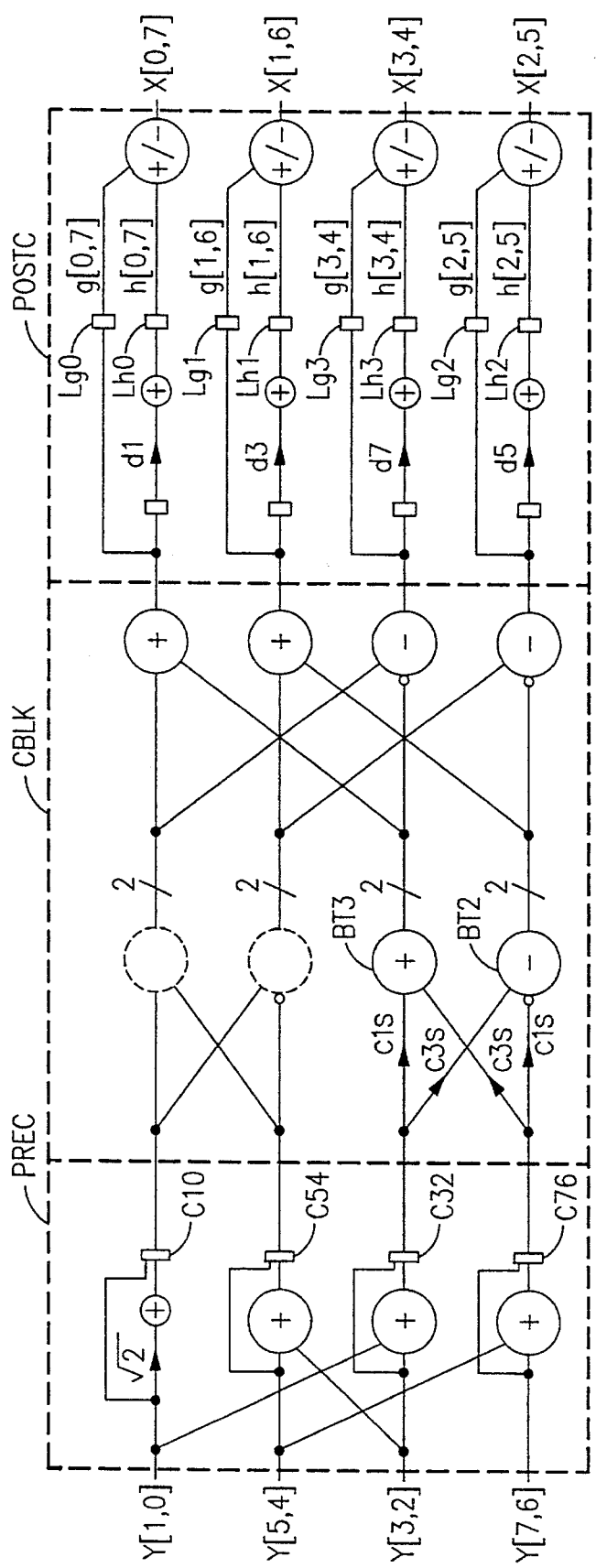
FIGS. 2a and 2b, collectively referred to as FIG. 2, are respectively a block diagram and a key that illustrate the combined, simplified, two-stage architecture of an IDCT system according to the invention.
Figure 2B:
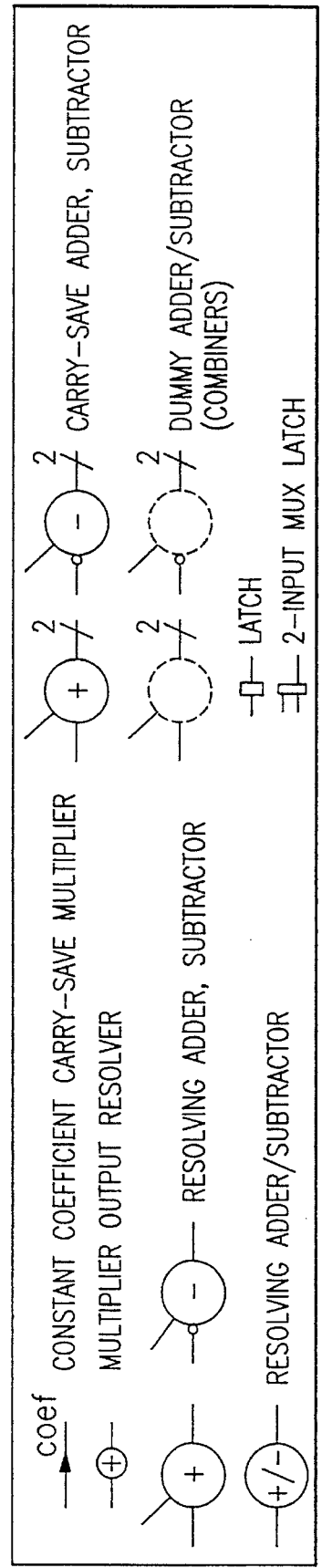

FIG. 2 is a block diagram that illustrates a preferred structure. In this preferred embodiment of the invention, the even- and odd-numbered inputs are time-multiplexed and are processed separately in the common block CBLK. The inputs may be processed in either order.

In FIG. 2, the notation Y[1,0], Y[5,4], Y[3,2] and Y[7,6] is used to indicate that the odd-numbered inputs Y1, Y3, Y5, Y7 preferably pass through the calculation circuitry first, followed by the even-numbered inputs Y0, Y2, Y4, Y6. This order is not essential to the emdodiment; nonetheless, as is explained below, certain downstream arithmetic operations are performed only on the odd-numbered inputs, and by entering the odd-numbered input values first, these downstream operations can be going on at the same time that arithmetic operations common to all inputs are performed upstream on the even-numbered inputs. This reduces the time that several arithmetic devices otherwise would remain idle.

Similarly, the notation X[0,7], X[1,6], X[3,4], X[2,5] is used to indicate that the low-order outputs X0, X1, X2, X3 are output first, followed by the high-order outputs X4, X5, X6, X7. As FIGS. 1 and 2 illustrate, the inputs are preferably initially not grouped in ascending order, although this is not necessary according to the invention. Thus, reading from top to bottom, the even-numbered inputs are Y0, Y4, Y2, and Y6 and the odd-numbered inputs are Y1, Y5, Y3 and Y7. Arranging the input signals in this order makes possible the simple "butterfly" data path structure shown in FIGS. 1 and 2 and greatly increases the interconnection efficiency of the implementation of the invention in silicon semiconductor devices.

In FIG. 2, adders and subtractors are indicated by circles containing either a "+" (adder), "−" (subtractor, that is, an adder with one complementing input), or "±" (resolving adder/subtractor, which is able to switch between addition and subtraction). The left-most adders and subtractors in the common block CBLK are preferably carry-save adders and subtractors, meaning that their output upon addition/subtraction of the two m-bit input words is the m-bit partial result in parallel with the m-bit or (m−1)-bit word containing the carry bits of the addition/subtraction. In other words, the first additions and subtractions in the common block CBLK are preferably unresolved, meaning that the addition of the carry bits is delayed until a subsequent processing stage. The advantage of this is that such carry-save adders/subtractors are faster than conventional resolving adders/subtractors since they do not need to perform the final addition of the carry-bit word to the result. Resolving adders may, however, also be used in order to reduce the bus width at the outputs of the adders.

FIG. 2 also illustrates the use of one- and two-input latches in the preferred embodiment of the invention. In FIG. 2, latches are illustrated as rectangles and are used in both the pre-common block PREC and the post-common block POSTC. Single-input latches are used at the inputs of the multipliers D1, D3, D5 and D7, as well as to latch the inputs to the resolving adders/subtractors that generate the output signals X0 to X7. As FIG. 2 illustrates, the inputs to these resolving adders/subtractors are the computed g(k) and h(k) values corresponding to the respective outputs from latches g[0,7], g[1,6], g[3,4] and g[2,5], and h[0,7], h[1,6], h[3,4] and h[2,5]. As such, the resolving adders/subtractors perform the addition or subtraction indicated in expressions E16 and E17 above.

As is explained above, the even-numbered inputs Y0, Y2, Y4, and Y6 do not need to be paired before being processed in the common block CBLK. Not only do the odd-numbered inputs require such pairing, however, but the input Y1 must also be multiplied by √2 in order to ensure that the proper input values are presented to the common block CBLK. The pre-common block PREC, therefore, includes a 2-input multiplexing ("mux") latch C10, C54, C32 and C76 for each input value. One input to the 2-input mux latch is consequently tied directly to the unprocessed input values, whereas the other input is received from the resolving adders and, for the input Y1, the resolving √2-multiplier. The correct paired or unpaired inputs can therefore be presented to the common block CBLK easily by simple switching of the multiplexing latches between their two inputs.

As FIG. 2 illustrates, the √2-multiplier and the multipliers D1, D3, D5, D7 preferably resolve their outputs, that is, they generate results in which the carry bits have been added in to generate a complete sum. This ensures that the outputs from the multipliers have the same bus width as the un-multiplied inputs in the corresponding parallel data paths.

The preferred embodiment of the common block also includes one "dummy" adder and one "dummy" subtractor in the forward data paths for Y[1,0] and Y[5,4], respectively. These devices act to combine the two inputs (in the case of the dummy subtractor, after 2's-complementing the one input) in such a way that they are passed as parallel outputs. In these cases, the one input is manipulated as if it contained carry bits, which are added on in the subsequent processing stage. The corresponding addition and subtraction is thus performed, although it is delayed.

This technique reduces the resources needed in the upper two data paths since a full-scale adder/subtractor need not be implemented for these devices. The "combiners" thus act as adder and subtractors and can be implemented either as simple conductors to the next device (for addition), or as a row of inverters (for subtraction), which requires little or no additional circuitry.

The use of such combiners also means that the outputs from the initial adders and subtractors in the common block CBLK will all have the same width and will be compatible with the outputs of the carry-save adder/subtractors found in the bottom two data paths, with which they form inputs to the subsequent resolving adders and subtractors in the common block CBLK.

As is mentioned above, the even-numbered inputs are processed separately from the odd-numbered in this preferred embodiment of the invention. Assume that the odd-numbered inputs are to be processed first. Supervisory control circuitry (not shown in FIG. 2) then applies the odd-numbered input words to the pre-common block PREC, and selects the lower inputs (viewed as in FIG. 2) of the multiplexing latches C10, C54, C32, C76, which then will store the paired values p0 to p3 (see FIG. 1 and the definition of p(n) above). The latches Lh0, Lh1, Lh3, and Lh2 are then activated to latch the values H0, H1, H3, and H2, respectively.

The supervisory control circuitry then latches and then selects the upper inputs of the two-input multiplexing latches C10, C54, C32 and C76 in the pre-common block PREC and applies the even-numbered input words to these latches. Since the even-numbered inputs are used to form the values of g0 to g3, the supervisory control circuitry then also opens the latches Lg0 to Lg3 in the post-common block POSTC, which store the g(k) values.

Once the g(k) and h(k) values are latched, the post-common block POSTC outputs the high-order output signals X7, X6, X5 and X4 by switching the resolving adder/subtractors to the subtraction mode. The low-order output signals X3, X2, X1, and X0 are then generated by switching the resolving adders/subtractors to the addition mode. Note that the output data can be presented in an arbitrary order, including natural order.

The preferred multiplexed implementation illustrated in greatly simplified, schematic form in FIG. 2, performs the same calculations as the non-multiplexed structure illustrated in FIG. 1. The number of adders, subtractors and multipliers in the common block CBLK is, however, cut in half and the use of dummy adder/subtractors further reduces the complexity of the costly arithmetic circuitry.

Figure 3:
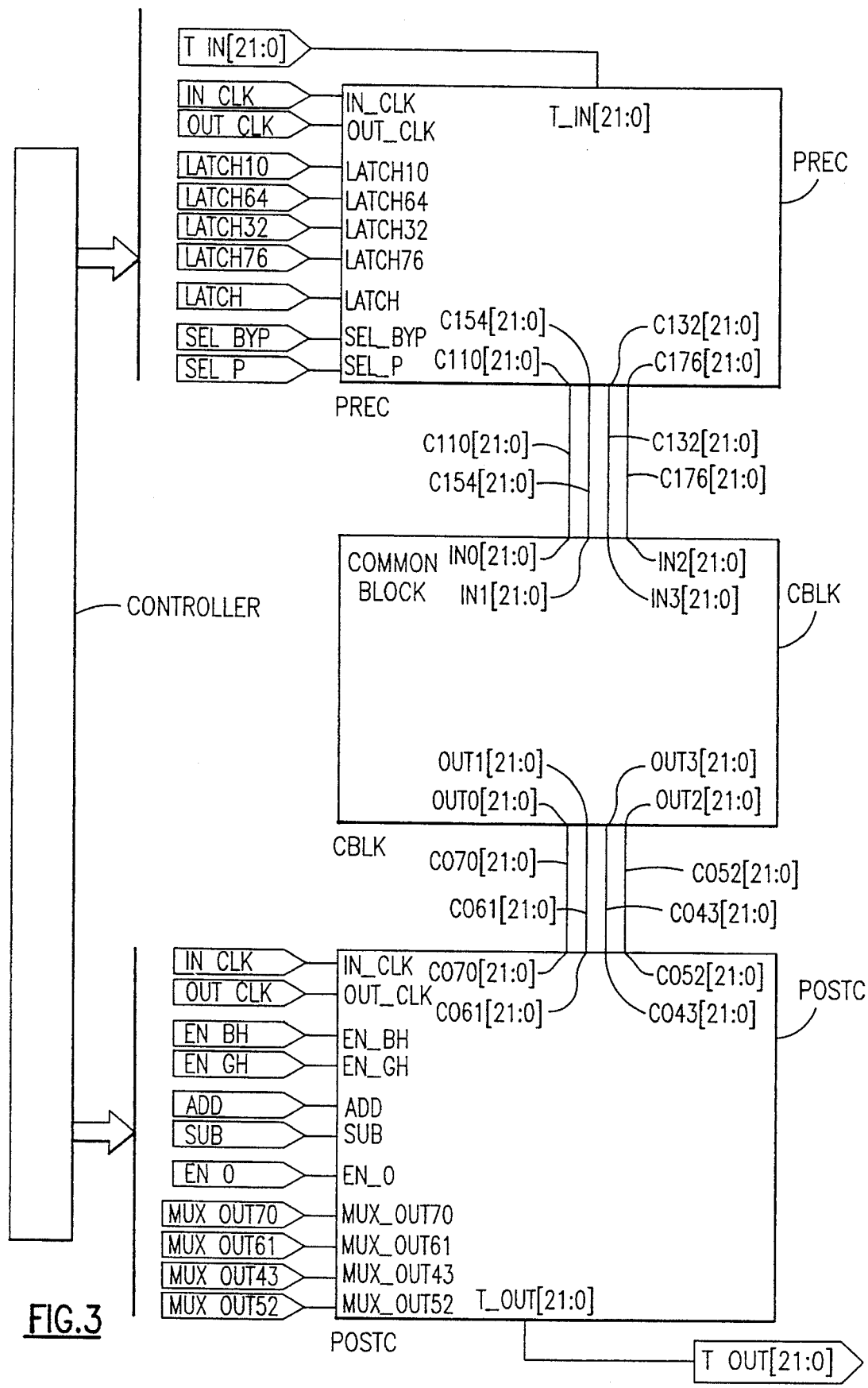
FIG. 3 is a simplified block diagram of the integrated circuits that comprise the main components of the IDCT system.

FIG. 3 illustrates the main components and data lines of an actual implementation of the IDCT circuit according to the embodiment. The main components include the pre-common block circuit PREC, the common block circuit CBLK, and the post-common block POSTC. The system also includes a controller CNTL that either directly or indirectly applies input, timing and control-signals to the pre-common block PREC and post-common block POSTC.

In the preferred embodiment of the invention, the input and output signals (Y0 to Y7 and X0 to X7, respectively) are 22 bits wide. Tests have indicated that this is the minimum width that is possible that still yields acceptable accuracy as measured by existing industry standards. As is explained in greater detail below, this minimum width is achieved in part by deliberately forcing certain carry words in selected arithmetic devices to be either a "1" or a "0". This bit manipulation, corresponding to an adjustment of certain data words, is carried out as the result of a statistical analysis of the results of the IDCT system according to the embodiment after using the embodiment for IDCT transformation of known input test data. By forcing certain bits to predetermined values, it was discovered that the effects of rounding and truncation errors could be reduced, so that the spatial output data from the IDCT system could be made to deviate less from the known, "correct" spatial data. The invention is equally applicable, however, to other data word lengths since the components used in the circuit according to the embodiment all can be adapted to different bus widths using known methods.

Although all four inputs that are processed together could be input simultaneously to the pre-common block PREC along 88 parallel conductors (4×22), pixel words are typically converted one at a time from the serial transmission data. According to the embodiment, input data words are therefore preferably all conveyed serially over a single, 22-bit input bus and each input word is sequentially latched at the proper input point in the data path. In FIG. 3, the 22-bit input data bus is labelled T_IN[21:0].

In the Figures and in the discussion below, the widths of multiple-bit signals are indicated in brackets with the high-order bit to the left of a colon ":" and the least significant bit (LSB) to the right of the colon. For example, the input signal T_IN[21:0] is 22 bits wide, with the bits being numbered from 0 to 21. A single bit is identified as a single number within square brackets. Thus, T_IN[1] indicates the next to least significant bit of the signal T_IN.

The following control signals are used to control the operation of the pre-common block PREC in the preferred embodiment of the invention:

IN_CLK, OUT_CLK: The system according to the embodiment preferably uses a non-overlapping two-phase clock. The signals IN_CLK and OUT_CLK are accordingly the signals for the input and output clock signals, respectively. These clock signals are used to enable alternating columns of latches that hold the values of input, intermediate, and output signals.

LATCH10, LATCH54, LATCH32, LATCH76: Preferably, one 22-bit word is input to the system at a time. On the other hand, four input signals are processed at a time. Each input signal must therefore be latched at its appropriate place in the architecture before processing with three other input words. These latch signals are used to enable the respective input latches. The signal LATCH54, for example, is first used to latch input signal Y5 and later to latch input signal Y4, which enters the pre-common block PREC at the same point as the input signal Y5 (see FIG. 2) but during a subsequent processing stage.

LATCH: Once the four even- or odd-numbered input signals are latched into the pre-common block PREC, they are preferably shifted at the same time to a subsequent column of latches. The signal LATCH is used to enable a second column of input latches that hold the four input values to be operated on by the arithmetic devices in the pre-common block PREC.

SEL_BYP, SEL_P: As FIG. 2 illustrates, the even-numbered input signals that are latched into the latches C10, C54, C32, and C76 should be those that bypass the adders and the √2 resolving multiplier. The odd-numbered input signals, however, must first be paired to form the paired inputs p(n), and the signal Y1 must be multiplied by √2. The control signal SEL_BYP is used to select the ungrouped, bypass input signals (the even-numbered inputs), whereas the signal SEL_P is activated in order to select the paired input signals. These signals are thus used to control gates that act as multiplexers to let the correct signals pass to the output latches of the pre-common block PREC.

As is explained above, not arranging the inputs in strictly ascending order leads to a simplified "butterfly" bus structure with high interconnection efficiency. As is explained above, the odd inputs are preferably applied as a group to the pre-common block first, followed by the even-numbered inputs, but any order may be used within each odd or even group. Any order of inputs may be used, however, suitable latch arrangements being provided to process the odd-numbered and even-numbered inputs are separately, or at least in separate regions of the circuit.

The supervisory control circuitry also generates timing and control signals for the post-common block POSTC. These control signals are as follows:

EN_BH, EN_GH: Considering for the moment FIG. 1, the outputs from the common block CBLK, after processing of the odd-numbered inputs, are shown as H0, H1, H3 and H2. These signals are then sent to the coefficient multipliers, d1, d3, d7, d5, respectively, in the first post-common block POSTC 1. The signal EN_BH is used to enable latches that hold signals corresponding to H0 to H3. The signal EN_GH is used to enable latches that hold the g0 to g3 values, as well as latches that hold the h0 to h3 values after they have been multiplied in the coefficient multipliers.

ADD, SUB: As FIG. 2 illustrates, the embodiment includes a bank of resolving adders/subtractors that sum and difference g(k) and h(k) values in order to form the low-order and high-order outputs, respectively. The signals ADD, SUB are used to set the resolving adders/subtractors in the addition and subtraction modes, respectively.

EN_O: This signal is used to enable output latches that latch the results from the resolving adders/subtractors.

MUX_OUT70, MUX_OUT61, MUX_OUT43, MUX_OUT52: The output data from the system is preferably transmitted over a single 22-bit output bus, so that only one output value (X0 to X7) is transferred at a time. These signals are activated sequentially to select which of the four latched output values is to be latched into a final output latch. These signals thus act as the control signals for a 4-to-1 multiplexer.

T_OUT[21:0]: This label indicates The 22-bit output signal from the post-common block POSTC.

The output signals from the pre-common block PREC are latched to form the inputs signals to the common block CBLK. In FIG. 3, the output signals from the pre-common block PREC are represented as the four 22-bit data words CI10[21:0], CI54[21:0], CI32[21:0], CI76[21:0], which become the input signals IN[0], IN[1], IN[3], IN[2], respectively, to the common block CBLK.

As FIG. 3 shows, the four 22-bit results from the common block CBLK are transferred in parallel as output signals OUT0[21:0], OUT1[21:0], OUT3[21:0], OUT2[21:0], which are then latched as the input signals of the post-common block POSTC as CO70[21:0], CO61[21:0], CO43[21:0], CO52[21:0].

One should note in particular that no control signals are required for the common block CBLK. Because of the unique structure of the IDCT system in this example, the common block of operations can be performed as pure logic operations, with no need for clock, timing or control signals. This further reduces the complexity of the device. One should note that certain applications (particularly those in which there is plenty of time to perform all needed arithmetic operations) the pre-common and post-common blocks PREC, POSTC may also be arranged to operate without clock, timing or control signal.

Figure 4A:
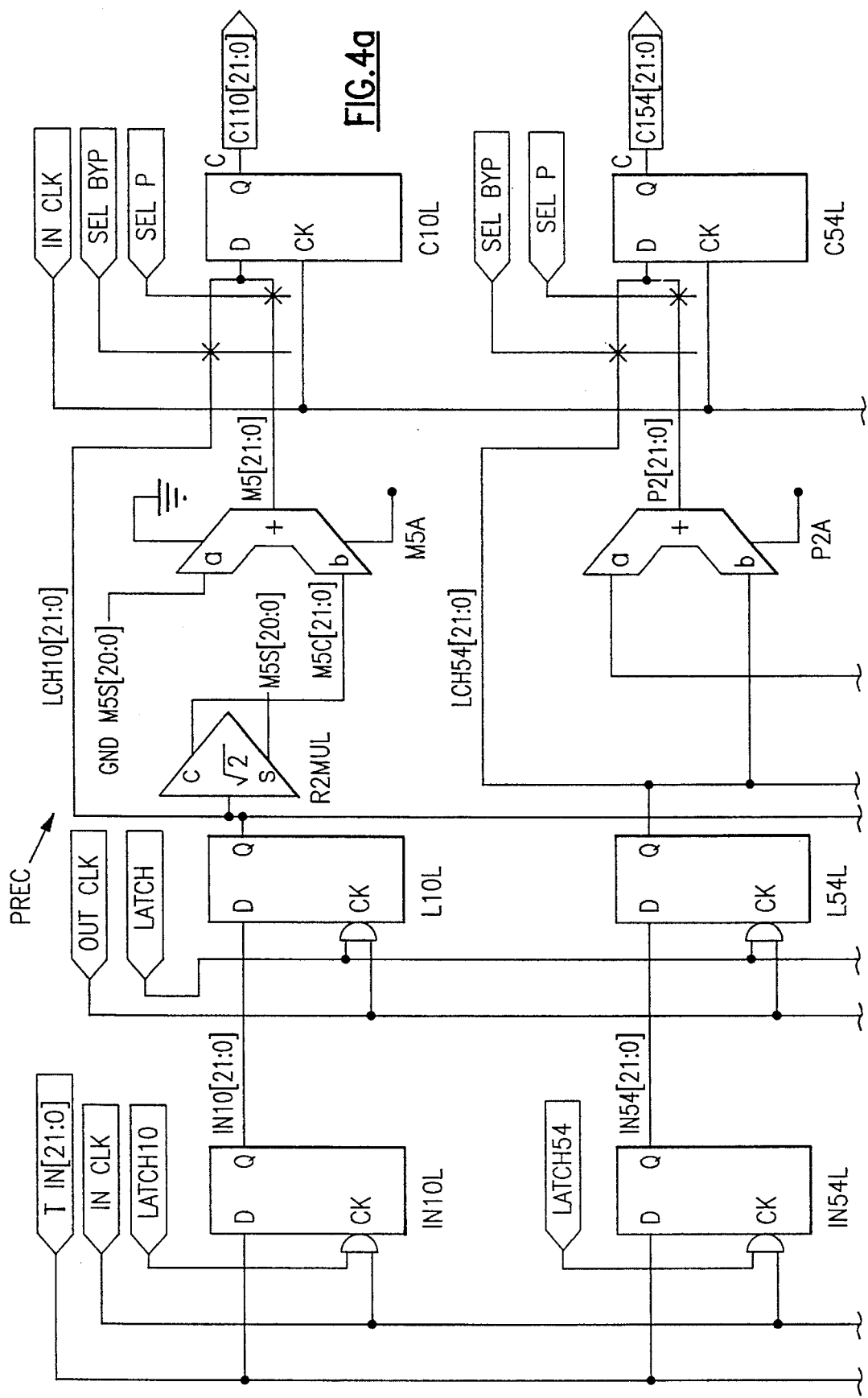
FIGS. 4a and 4b together are a block diagram of a pre-processing circuit corresponding to one of the main system components; for ease of explanation, these figures are referred to collectively as FIG. 4.
Figure 4B:
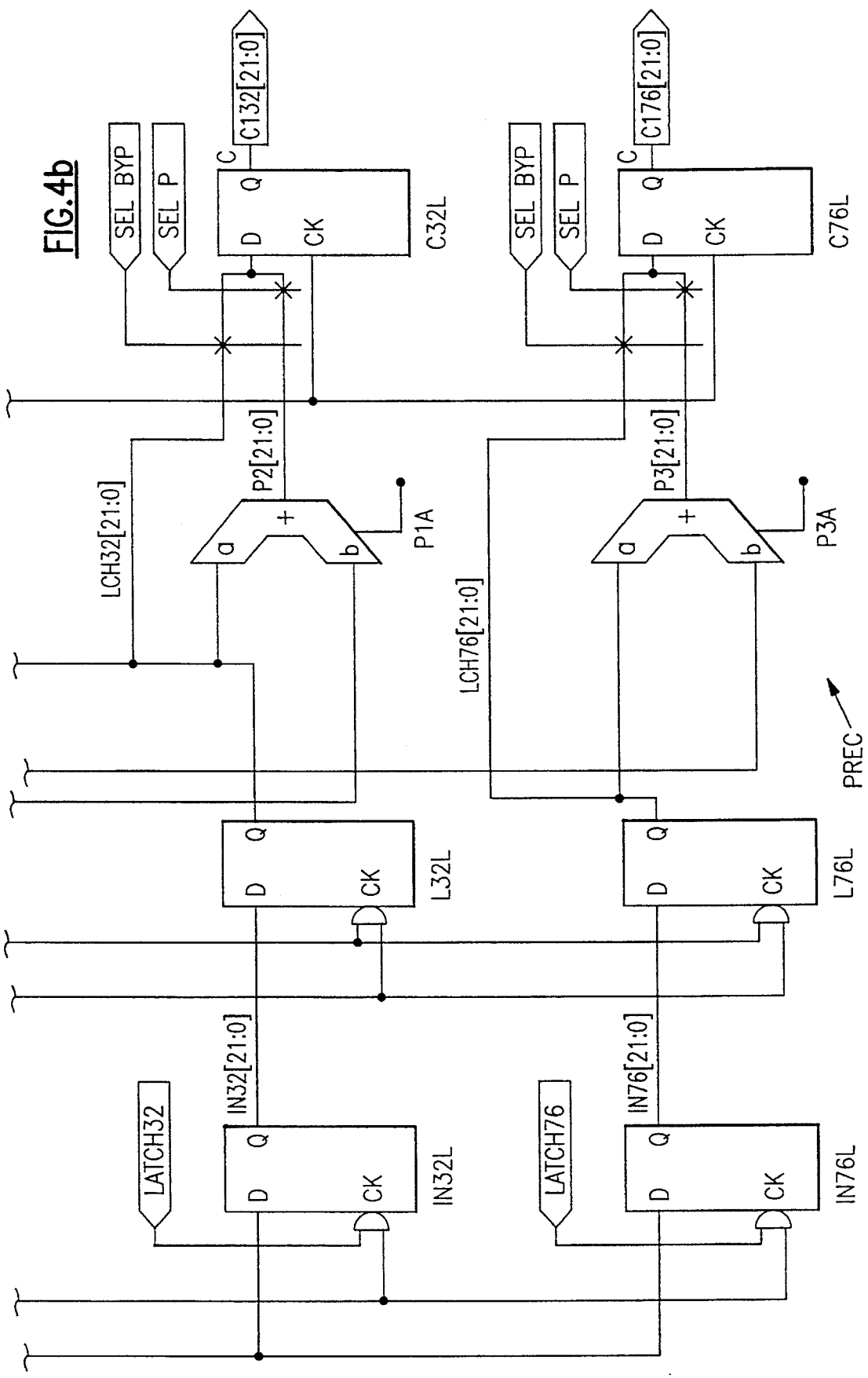

FIG. 4 is a block diagram of the pre-common block PREC. In this and following figures, the notation "S1[a], S2[b], . . . , SM[Z]," where S is an arbitrary signal label and a, b, . . . , z are integers within the range of the signal's bus width, indicates that the selected bits a, b, . . . ,z from the signals S1, S2, . . . ,SM are transferred in parallel over the same bus, with the most significant bits (MSBs) being the selected bits "a" of the signal S1, and the least significant bits (LSBs) being the selected bits "z" of signal SM. The selected bits do not have to be individual bits, but rather, entire or partial multi-bit words may also be transmitted along with other single bits or complete or partial multi-bit words. In the figures, the symbol S will be replaced by the corresponding signal label.

For example, in FIG. 4, a √2-multiplier is shown as R2MUL. The "save" or "unresolved sum" output from this non-resolving multiplier is indicated as the 21-bit word M5S[20:0]. The "carry" output from the multiplier R2MUL is shown as the 22-bit word M5C[21:0], which is transferred over the bus to the "b" input of a carry-save resolving adder M5A. (Recall that a "0" is inserted as an MSB to the least significant 21 bits of the save output, however, before being applied to the "a" input of the resolving adder M5A. This is indicated in FIG. 4 by the notation GND,M5S[20:0]). In other words, the conductor corresponding to the MSB input to the adder M5A is forced to be a "0" by tying it to ground GND.

In order to understand why a "0" is thus inserted as the 22'nd bit of the "sum" output, observe that if the partial sum of a multiplication is n places wide, the carry word will normally also have n places. In adding the carry word to the partial sum, however, the carry word is shifted one place to the left relative to the partial sum. The carry word therefore extends to n+1 places, with a valid data bit in the n+1'th position and a "0" in the least significant position (since there is nothing before this position to produce a carry bit into the units position). If these two words are used as inputs to a resolving binary adder, care must be taken to ensure that the bits (digits) of the carry word are properly aligned with the corresponding bits of the partial sum. This also ensures that the decimal point (even if only implied, as in integer arithmetic) is kept "aligned" in both words. Assuming the inputs to the adder are n+1 bits wide, a "0" can then be inserted into the highest-order bit of all n-bit positive partial sum words to provide an n+1-bit input that is aligned with the carry word at the other input.

As is described above, the four inputs that are processed at a time in the pre-common block PREC are transferred over the input bus T_IN[21:0]. This input bus is connected to the inputs of four input latches IN10L, IN54L, IN32L, and IN76L. Each respective latch is enabled only when the input clock signal IN_CLK and the corresponding latch selection signal LATCH10, LATCH54, LATCH32, LATCH76 are high. The four inputs can therefore be latched into their respective input latches in four periods of the IN_CLK signal by sequential activation of the latch enabling signals LATCH10, LATCH54, LATCH32, LATCH76. During this time, the LATCH signal should be low (or on a different phase) to enable the input latches IN10L, IN54L, IN32L, IN76L to stabilize and latch the four input values.

Figure 7A:
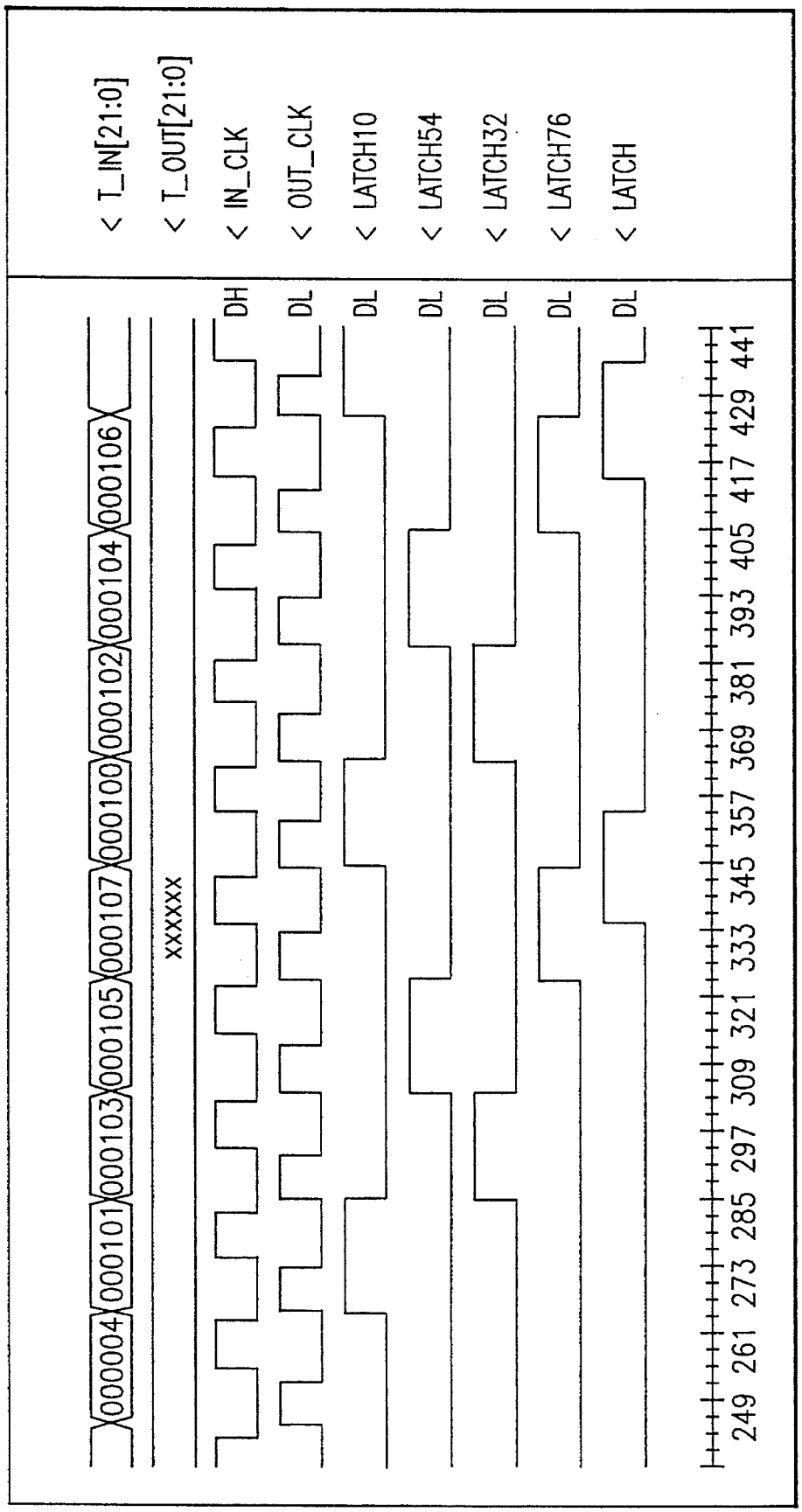
FIGS. 7a, 7b, 7c are timing diagrams that show the relationships between timing and control signals in the IDCT system in the preferred embodiment.

An example of the timing of the latches is illustrated in FIG. 7a. Once the four input signals are latched in the preferred order, they are passed to a second bank of latches L10L, L54L, L32L, L76L. These second latches are enabled when the signals OUT_CLK and LATCH are high. This signal timing is also illustrated in FIG. 7a.

Note that the system does not have to delay receipt of all eight input words. Once all the even or odd input words are received and latched in IN10L, IN54L, IN32L and IN76L, they can be transferred at the next high period of OUT_CLK to the latches L10L, L54L, L32L and L76L. This then frees the IN latches, which can begin to receive the other four input signals without delay at the next rising edge of IN_CLK.

The 2-digit suffix notation [10, 54, 32, 76] used for the various components illustrated in the figures indicates that odd-numbered signals are processed first, followed by the even-numbered signals on a subsequent pass through the structure. As is mentioned above, this order is not necessary.

Once the four input signals are latched in proper order in the second latches L10L, L54L, L32L, L76L, the corresponding values are either passed as inputs to output latches C10L, C54L, C32L, and C76L on activation of the selected bypass signal SEL_BYP, or they are passed as paired and multiplied inputs to the same output latches upon activation of the "select p" signal SEL_P. In other words, all signals are passed, both directly and indirectly, via arithmetic devices, to the output latches C10L, C54L, C32L, C76L of the pre-common block PREC. The proper values, however, are loaded into these latches by activation of the "select bypass" signal SEL_BYP (for the even-numbered inputs Y0, Y2, Y4, Y6) or the "select p" signal SEL_P (for the odd-numbered inputs Y1, Y3, Y5, and Y7). The desired timing and order of these and other control signals is easily accomplished in a known manner by proper configuration and/or [micro-] programming of the controller CNTL.

The uppermost input value at the output of latch L10L is passed first to the √2-multiplier R2MUL and then to the resolving adder M5A as indicated above. The output from the resolving adder M5A is shown as M5[21:0], which corresponds to the 22-bit value p0 shown in FIG. 1. The 22-bit signal M5[21:0] is thus the equivalent of the resolved multiplication of the output from the latch L10L by √2. The outputs from the other three latches L54L, L32L, L76L are also transferred to corresponding output latches C54L, C32L, and C76L, respectively, both directly via 22-bit latch buses LCH54[21:0], LCH32[21:0], LCH76[21:0] and indirectly to the output latches via resolving adders P2A, P1A, and P3A, respectively.

Each resolving adder P2A, P1A, P3A has two inputs, "a" and "b". For adder P2A, the one input is received from the latch L32L, and the other input is received from the latch L54L. For input values Y5 (latched in L54L) and Y3 (latched in L32L), the output from the adder P2A will therefore be equal to Y5+Y3, which, as is shown above, is equal to p(2). The adders thus "pair" the odd-numbered inputs to form the paired input values p(1), p(2), and p(3).

Of course, the even-numbered input signals latched in L54L, L32L, L76L will also pass through the resolving adders P2A, P1A, and P3A, respectively, but the resulting p "values" will not be passed to the output latches C54L, C32L, and C76L because the "select p" signal SEL_P will not be activated for even-numbered inputs.

The values that are latched in the output latches C10L, C54L, C32L, and C76L upon activation of the input clock signal IN_CLK will therefore be equal to either the even-numbered inputs Y0, Y2, Y4, Y6 or the paired input values P0, P1, P2, P3 for the odd-numbered inputs. One should recall that the input Y(1) is "paired" with the value Y(−1), which is assumed to be zero. In FIG. 4, this assumption is implemented by not adding anything to the value Y1; rather, Y1 is only multiplied by √2, as is shown in FIGS. 1 and 2.

Figure 5A:
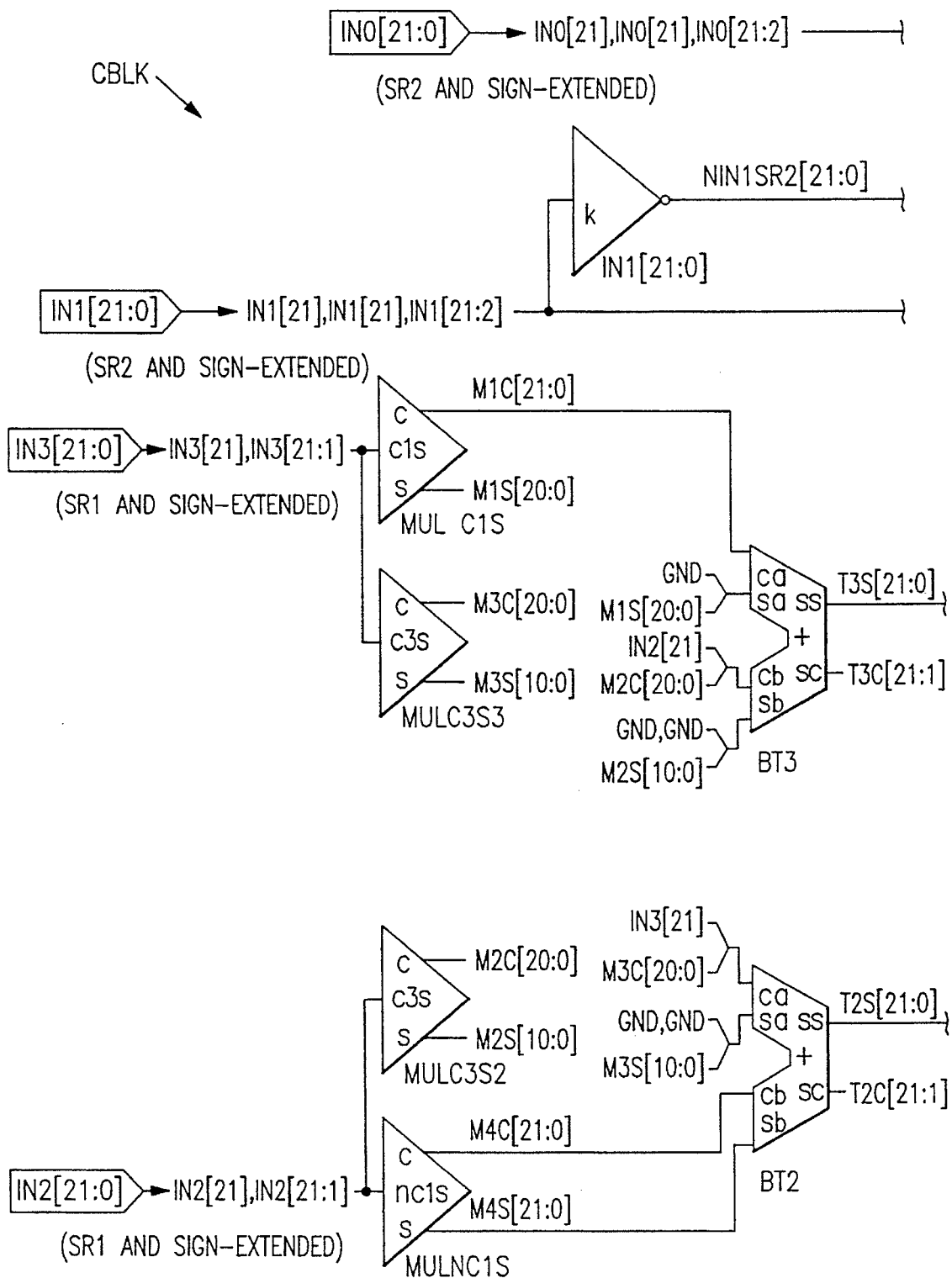
FIGS. 5a and 5b together are a block diagram of a common processing circuit in the IDCT system; for ease of explanation, these figures are referred to collectively as FIG. 5.
Figure 5B:
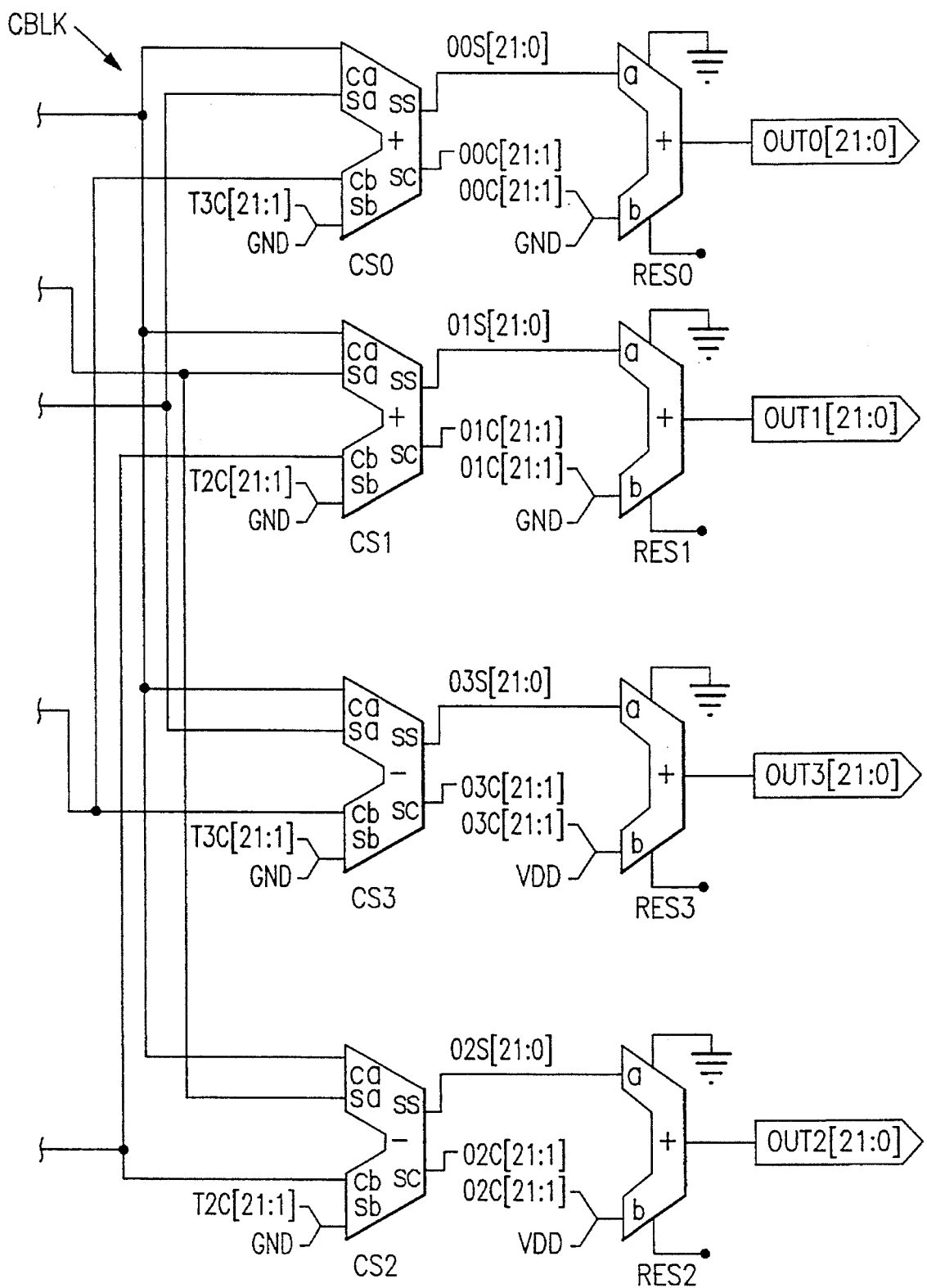

FIG. 5 illustrates the preferred architecture of the common block CBLK according to the embodiment. Because of the various multiplications and additions in the different system blocks, it is necessary or advantageous to scale down the input values to the common block before performing the various calculations; this ensures a uniform position for the decimal point (which is implied for integer arithmetic) for corresponding inputs to the various arithmetic devices in the system.

The input values IN0[21:0] and IN1[21:0] are accordingly scaled down by a factor of four, which corresponds in digital arithmetic to a right shift of two bits. In order to preserve the sign of the number (keep positive values positive and negative values negative) in binary representation, the most significant bit (MSB) must then be replicated in the two most significant bits of the resulting right-shifted word; this process is known as "sign extension". Accordingly, the input value IN0 is downshifted by two bits with sign extension to form the shifted input value indicated as IN0[21],IN0[21], IN0[21:2]. The input value IN1[21:0] is similarly sign-extended two places. The input values IN3 and IN2 (corresponding, respectively, to inputs Y[3,2] and Y[7,6]) are shifted right one position with sign extension. The third input is therefore shifted and extended as IN3[21],IN3[21:1]. The input IN2 is similarly shifted and extended to form IN2[21],IN2[21:1]. These one-position shifts correspond to truncated division by a factor of two.

As FIG. 2 shows, the inputs IN3, IN2 are those which must be multiplied by the scaled coefficients c1s and c3s. Each input IN3 and IN2 must be multiplied by each of the scaled coefficients. As FIG. 5 illustrates, this is implemented by the four constant-coefficient carry-save multipliers MULC1S, MULNC1S, MULC3S3, and MULC3S2. One should note that the bottom multiplier for IN2 is an inverting multiplier MULNCIS, that is, its output corresponds to the negative of the value of the input multiplied by the constant C1S. The value latched in C76 is thus subtracted from the value latched in C32 (after multiplication by C3S). By providing the inverting multiplier MULNC1S, this subtraction is implemented by adding the negative of the corresponding value, which is equivalent to forming a difference. This allows the use of identical circuitry for the subsequent adders, but a non-inverting multiplier may be used with a following subtractor.

In the illustrated embodiment, four cosine coefficient multipliers MULC1S, MULNC1S, MULC3S3, and MULC3S2 are included. If arrangements are made for signals to pass separately through multipliers, however, the necessary multiplications could be implemented using only two multipliers, one for the c1s coefficient and one for the c3s coefficient.

The multipliers MULC1S, MULNC1S, MULC3S3, and MULC3S2 are preferably of the carry-save type, which means that they produce two output words, one corresponding to the result of the various rows of additions performed within a hardware multiplier, and another corresponding to the carry bits generated. The outputs from the multipliers are then connected as inputs to either of two 4-input resolving adders BT2, BT3.

For ease of illustration only, five of the output buses from the multipliers are not drawn connected to the corresponding input buses of the adders. These connections are to be understood, and are illustrated by each respective output and input having the same label. Thus, the save output M1S[20:0] of the multiplier MULC1S is connected to the lower 21 bits of the "save-a" input "sa" of the adder BT3.

In FIG. 5, five of the inputs to the adders BT2 and BT3 are shown as being "split". For example, the "ca" input of the adder BT2 is shown as having IN3[21] over M3C[20:0]. This is to be interpreted to mean that, of the 22-bit input word, IN3[21] is input as the MSB, with the 21 bits of M3C[20:0] being input as the least significant 21 bits. Similarly, the "sa" (the "save-a" input) of the same adder is shown as being GND,GND over M3S[19:0]. This means that two zeros are appended as the two most significant bits of this input word. Such appended bits ensure that the proper 22-bit wide input words are formed with the proper sign.

The carry-save adders BT2 and BT3 add the carry and save words of two different 22-bit inputs to form a 22-bit output save word T3S[21:0] and a 21-bit output carry word T3C[21:1]. The input to each adder is thus 88 bits wide and the output from each adder is 43 bits wide. As FIG. 2 indicates, the output from the latch C10 is combined with the output from the latch C54 in the upper-most data path before addition with the output from the carry-save adder BT3. The "combination" is not, however, necessary until reaching the following adder in the upper data path. Consequently, as FIG. 5 shows, the shifted and sign-extended input value IN0 is connected to the upper carry input.

The upper carry input of adder CS0 is connected to the shifted and sign-extended input value IN0, and the shifted and sign-extended input IN1 is connected as the upper save input of the same adder. In other words, IN0 and IN1 are added later in the adder CS0.

The designation "dummy" adder/subtractor used in FIG. 2 therefore indicates which operation must be performed, although it does not necessarily have to be performed at the point indicated in FIG. 2. Similarly, the lower dummy subtractor shown in FIG. 2 requires that the output from latch C54 be subtracted from the output from latch C10. This is the same as adding the output from C10 to the complement of the output of C54.

Referring once again to FIG. 5, the complement of the input IN1 (corresponding to the output of latch C54 in FIG. 2) is performed by a 22-bit input inverter IN1I[21:0] (which generates the logical inverse of each bit of its input, bit-for-bit). The complement of IN1 value—NIN1[21:0]—is passed to the upper "save" input of the adder CS1, with the corresponding upper "carry" input being the shifted and sign-extended IN0. The upper portion of the adder CS1 therefore performs the subtraction corresponding to IN0 minus IN1.

In the lower two data paths shown in FIG. 2, resolving subtractors are used instead of the resolving adders shown in the upper two data paths at the output of the common block CBLK. Each resolving adder or subtractor is equivalent to a carry-save adder or subtractor followed by a resolving adder. This is shown in FIG. 5. Subtractors CS2 and CS3 have as their inputs the processed values of IN0 to IN3 according to the connection structure shown in FIG. 2.

The 22-bit carry and save outputs from each of the adders/subtractors CS0–CS3 are resolved in the resolving adders RES0–RES3. Resolution of carry and save outputs is well understood in the art of digital design and is therefore not described in greater detail here. As FIG. 5 illustrates, the save outputs from the carry-save adders/subtractors CS0–CS3 are passed directly as 22-bit inputs to the "a"-input of the corresponding resolving adders RES0–RES3.

As is well known, the 2's-complement of a binary number is formed by inverting each of its bits (changing all "1's" to "0's" and vice versa) and then adding "1". Note that the "1" can be added immediately after the bit inversion, or later. The LSB of a carry word will always be a "0", which is implemented in the illustrated embodiment by tying the LSB of the carry words O0C and O1C to ground GND as they are input to the resolving adders RES0 and RES1, respectively. The addition of "1" to the carry outputs of the subtractors CS2 and CS3 to form 2's-complemented values, however, is implemented by tying the LSB of these data words O2C and O3C to the supply voltage VDD, thus "replacing" the "0" LSB of the carry word by a "1", which is equivalent to addition by "1".

For the reasons given above, a "0" is appended as the LSB to the 21-bit carry words from the carry-save adders CS0 and CS1 (by tying the LSB to ground GND) and the LSB of the carry words from the carry-save subtractors CS2 and CS3 is set equal to "one" by tying the corresponding data line to the supply voltage VDD. The resolving adders RES0–RES3 therefore resolve the outputs from the adders/subtractors CS0–CS3 to form the 22-bit output signals OUT0[21:0]–OUT3[21:0].

Two advantages of the IDCT circuitry according to the embodiment can be seen in FIG. 5. First, no control or timing signals are required for the common block CBLK; rather, the input signals to the common block are already processed in such a way that they can be applied immediately to the pure-logic arithmetic devices in the common block. Second, by proper scaling of the data words, integer arithmetic can be used throughout (or, at least, decimal point for all values will be fixed). This avoids the complexity and slowness of floating-point devices, with no unacceptable sacrifice of precision.

Yet another advantage of the embodiment is that, by ordering the inputs as shown, and by using the balanced decimated method according to the embodiment, similar design structures can be used at several points in the silicon implementation. For example, in FIG. 5, the constant coefficient multipliers MULC1S, MULC3S3, MULC3S2, and MULNC1S all have similar structures and receive data at the same point in the data path, so that all four multipliers can be working at the same time. This eliminates "bottlenecks" and the semiconductor implementation is then able to take full advantage of the duplicative, parallel structure. The carry-save adders BT2 and BT3 similarly will be able to work simultaneously, as will the following carry-save adders and subtractors. This symmetry of design and efficient simultaneous utilization of several devices is common throughout the structure according to the embodiment.

FIG. 6 shows the preferred arrangement of the post-common block POSTC. As FIG. 2 shows, the primary functions of the post-common POSTC are to form the h0 to h3 values by multiplying the outputs of the common block by the coefficients d1, d3, d5, and d7; to add the g(k) and h(k) values to form the low-order outputs; and to subtract the h(k) values from the corresponding g(k) values to form the high-order outputs. Referring now to both FIG. 2 and FIG. 6, the post-common block POSTC latches the corresponding outputs from the common block CBLK into latches BH0L, BH1L, BH3L, and BH2L when the BH latches are enabled, the control circuitry sets the EN_BH signal high, and the output clock signal OUTC_CLK signal goes high. The g(k), g0 to g3 values are latched into corresponding latches G0L, G1L, G3L and G2L when the control circuitry enables these latches via the signal EN_GH and the input clock signal IN_CLK goes high.

The processed odd-numbered inputs, that is, the values h0 to h3, are latched into latches H0L H1L, H3L and H2L when the EN_GH and IN_CLK signals are high, via the constant coefficient multipliers D1MUL, D3MUL, D5MUL and D7MUL. These multipliers multiply, respectively, by d1, d3, d5 and d7. In the preferred embodiment, these constant-coefficient multipliers are preferably carry-save multipliers in order to simplify the design and to increase calculation speed. As FIG. 6 illustrates, the "carry" ("c") outputs from the constant coefficient multipliers are connected, with certain changes described below, to the a inputs of resolving adders H0A, H1A, H3A and H2A. The "save" ("s") outputs from the coefficient multipliers are similarly, with certain forced changes described below, connected to other input of the corresponding resolving adder.

As FIG. 6 illustrates, the LSB of the H0 signal is preferably forced to be a "1" by tying the corresponding line to the supply voltage VDD. The MSB of the corresponding "save" output for H0 is set to 0 (tied to ground GND), and the second bit (corresponding to H0S[1]) is set to "1". The data words from the carry and save outputs of the constant-coefficient multiplier D3MUL are similarly manipulated and input to the resolving adder H1A. The advantage of these manipulations is described below.

All 22-bits of the carry output from the coefficient multipliers D7MUL and D5MUL are connected directly to the "a" input of corresponding resolving adders H3A and H2A. The MSB of each multiplier's "save" output, however, is forced to be a "0" by tying the corresponding data line to ground GND.

The IDCT system described was tested against the CCITT specification described above. Because of the scaling and other well-known properties of digital adders and multipliers, some precision is typically lost during the various processing stages of the device. The inventors discovered through a statistical analysis of the 10,000-sample test run that forcing the various bits described above to either "0" or "1" reduced the expected error of the digital transformation. As a result of the bit manipulation of the data words, the embodiment achieved acceptable accuracy under the CCITT standard using only 22-bit wide data words, whereas 24 bits would normally be required to produce equivalent accuracy.

Because of limited precision, and truncation and rounding errors, there is typically some inaccuracy in every data word in an IDCT system. Of course, forcing selected bits of a data word to be other than they would be as a natural result of corresponding calculations is deliberately introducing "error". The inventors discovered, however, that the error thereby systematically introduced into a particular data word at a particular point in the hardware yielded statistically better overall results. Bit-forcing may also be applied "within" a multiplication, for example, by selectively forcing one or more carry bits to predetermined values.

The bit-forcing scheme need not be static, with certain bits always forced to take specified values, but rather a dynamic scheme may also be used. For example, selected bits of a data word may be forced to "1" or "0" depending on whether the word (or even some other data) is even or odd, positive or negative, above or below a predetermined threshold, etc.

Normally, only small systematic changes will be needed to improve overall statistical performance. Consequently, according to this embodiment, the LSB's of selected data words (preferably one bit and one data word at a time, although this is not necessary) are forced to be a "1" or a "0". The CCITT test is run, and the CCITT statistics for the run are compiled. The bit is then forced to the other of "1" or "0", and the test is rerun. Then the LSB (or LSBs) of other data words are forced to "1" and "0", and similar statistics are compiled. By examining the statistics for various combinations of forced bits in various forced words, a best statistical performance can be determined.

If this statistically based improvement is not required, however, the outputs from the constant-coefficient multipliers D1MUL, D3MUL, D5MUL, and D7MUL may be resolved in the conventional manner in the resolving adders H0A–H3A. The lower 21-bits of the outputs from the resolving adders H0A–H3A are applied as the upper 21-bits at the input of the corresponding latches H0L–H3L, with the LSB of these inputs tied to ground.

The outputs from the H-latches (H0L–H3L) and the G-latches (G0L–G3L) pairwise form the respective a- and b-inputs to resolving adder-subtractors S70A, S61A, S43A and S52A. As was indicated above, these devices add their inputs when the ADD signal is high, and subtract the "b" input from the "a" input when the subtraction enable signal SUB is high. The second bits of the upper two latch pairs H0L, G0L and H1L, G1L are manipulated by multiplexing arrangements in a manner described below.

The outputs from the resolving adder-subtractors S70A, S61A, S43A and S52A are latched into result latches R70L, R61L, R43L and R52L.

Figure 6A:
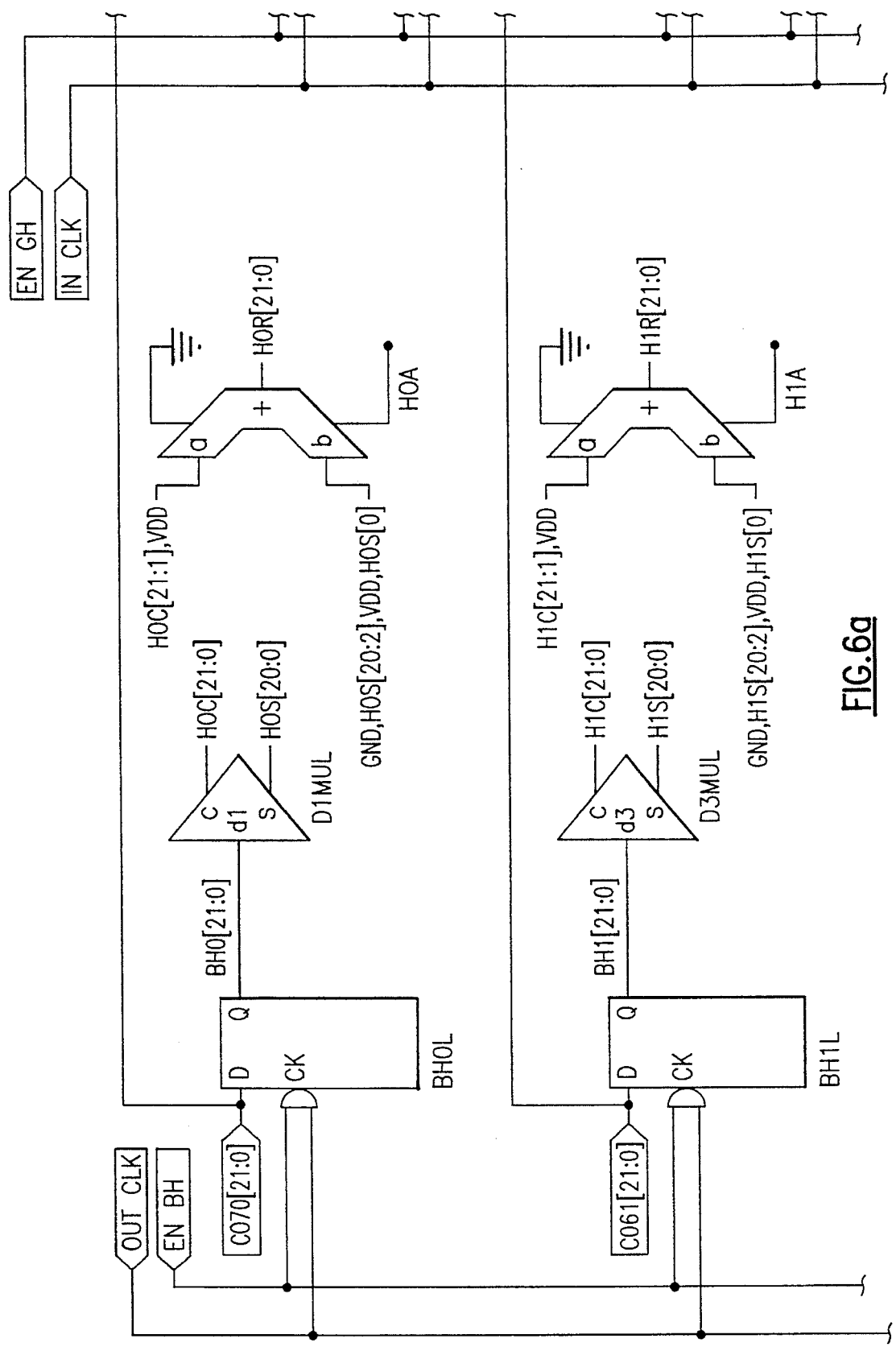
FIGS. 6a, 6b, 6c, and 6d together are a block diagram of a post-processing circuit that corresponds to another main component of the system; except as necessary to emphasize certain features, these figures are referred to collectively as FIG. 6.
Figure 6B:
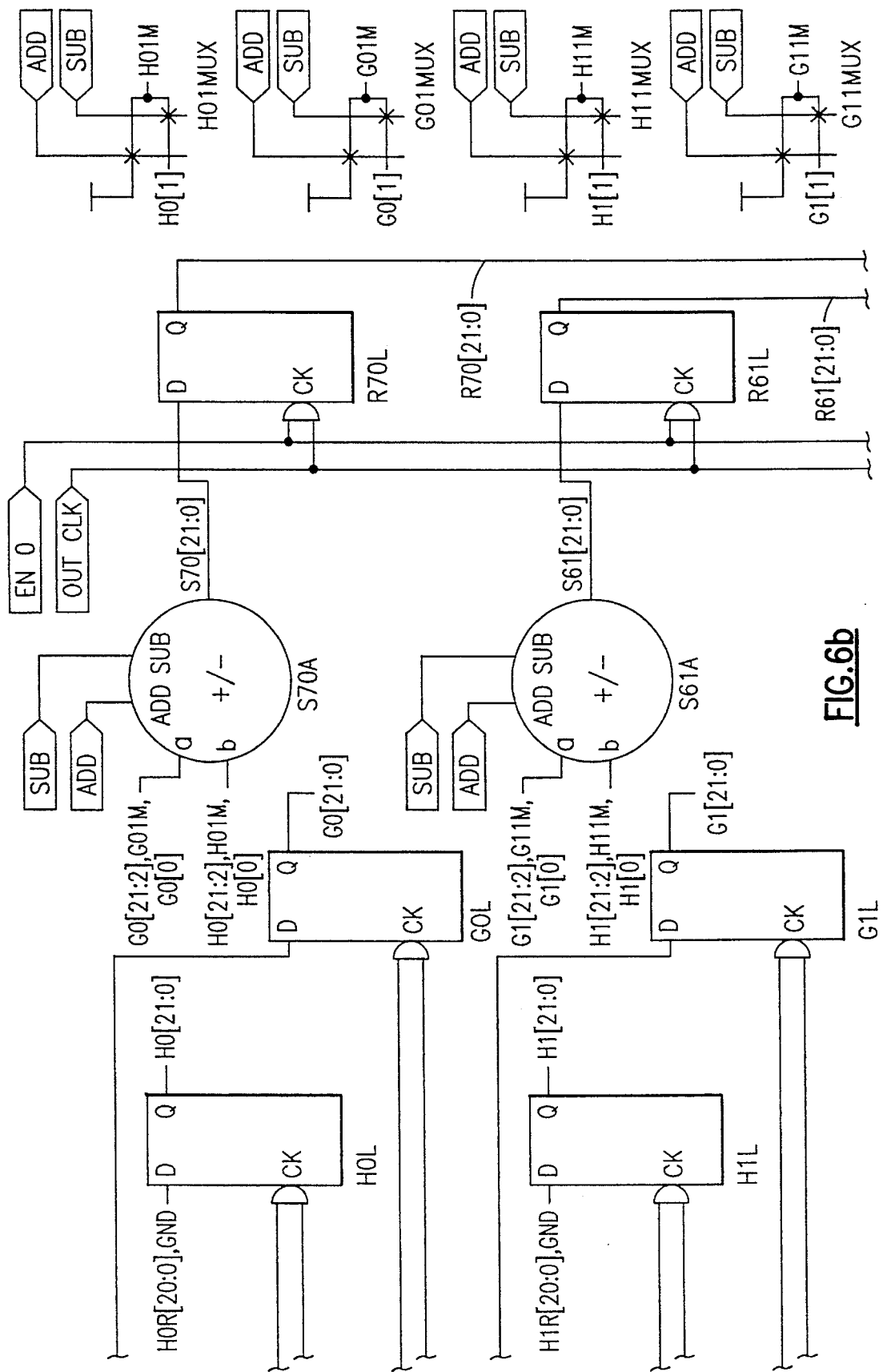
Figure 6C:
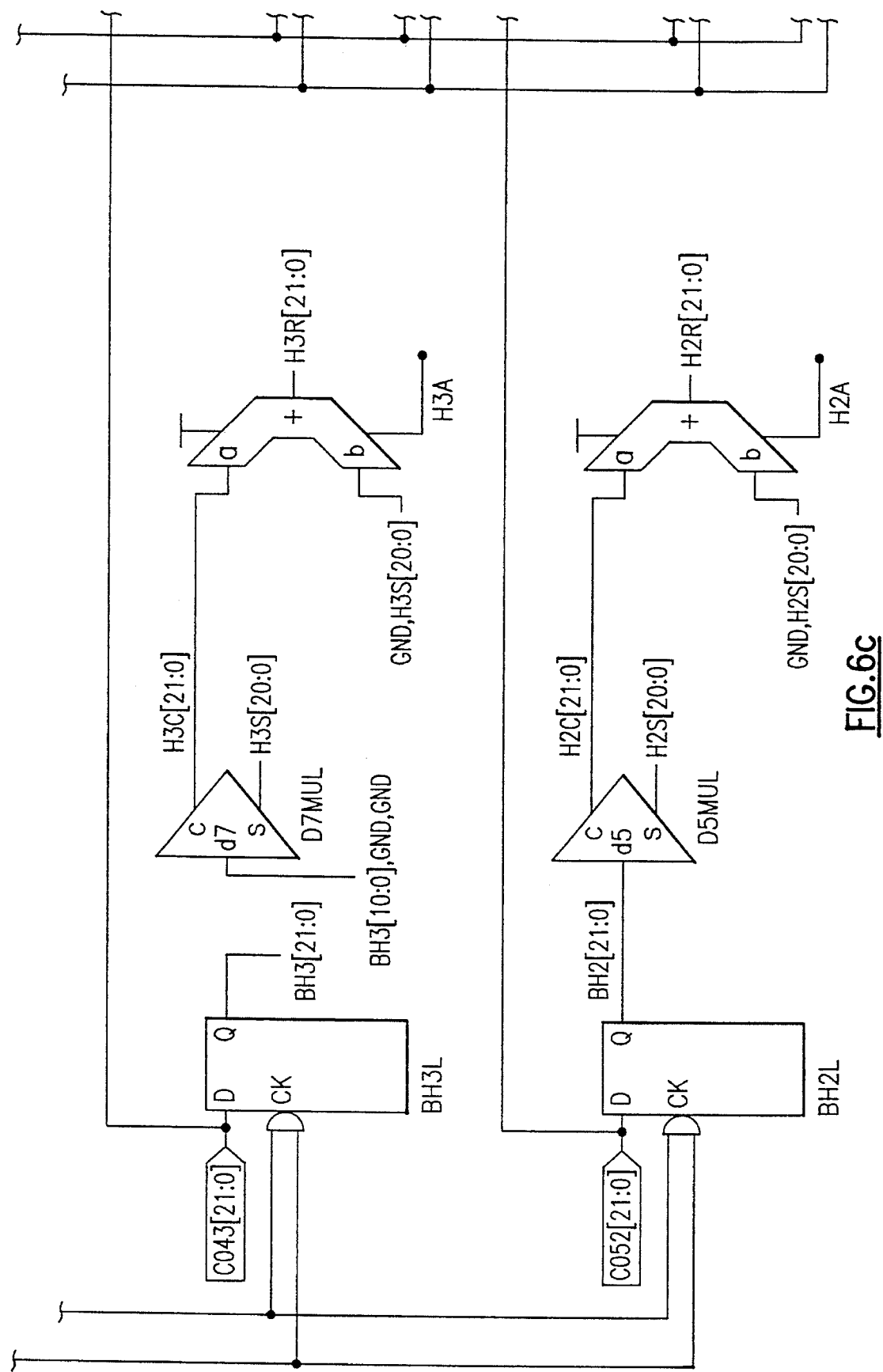
Figure 6D:
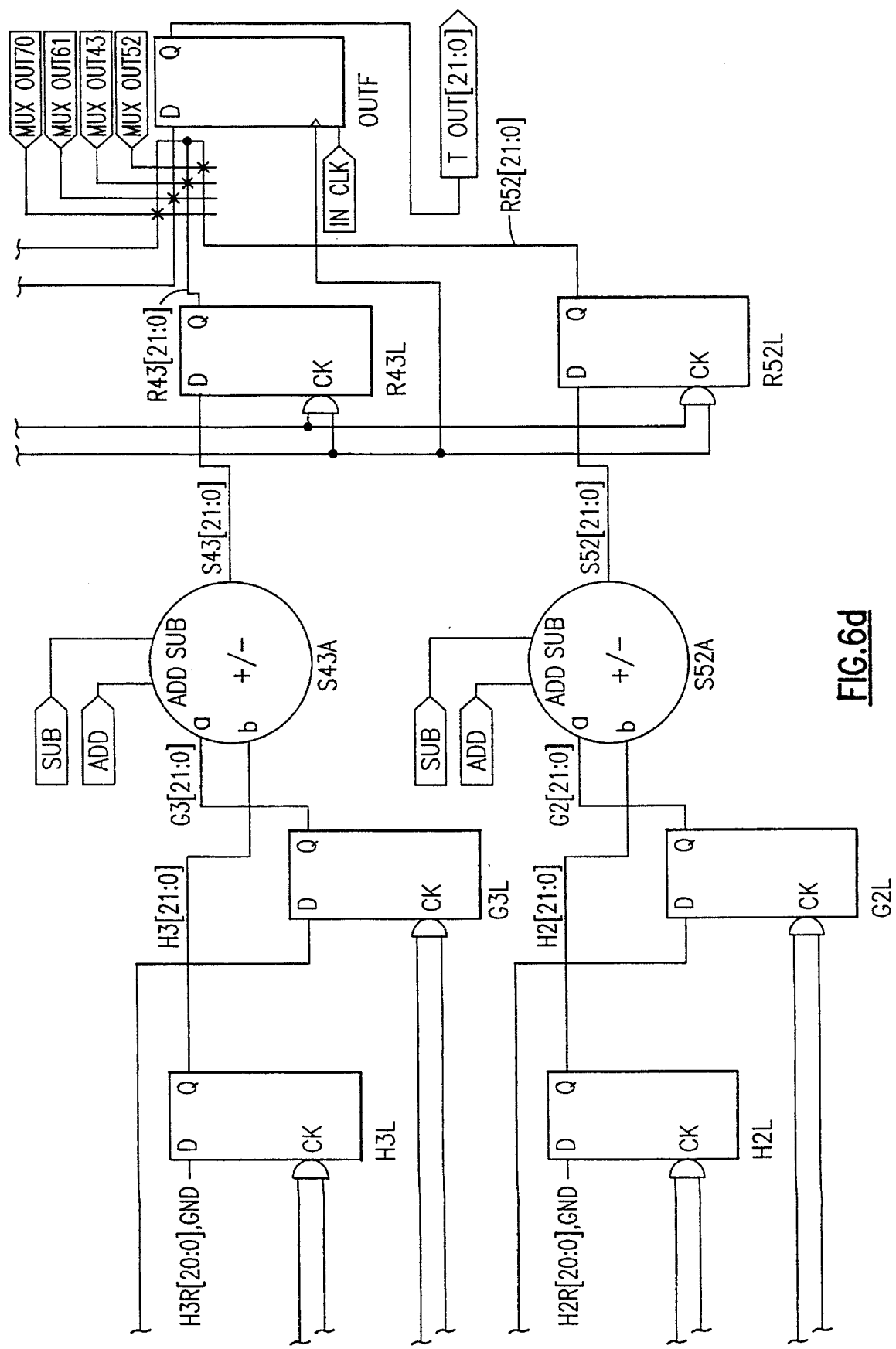

In FIG. 6b, the input words to the adder/subtractors S70A and S61A have the second bits of each input word manipulated. For example, the second bit of the input word to the "a"-input of the adder/subtractor S70A is G0[21:2], G0[1M], G0[0]. In other words, the second bit of this signal is set to the value G01M. The second bits of the other inputs to the adder/subtractors S70A and S61A are similarly manipulated. This bit manipulation is accomplished by four 2:1-bit multiplexers H01MUX, G01MUX, H11MUX and G11MUX (shown to the right in FIG. 6b). These multiplexers are controlled by the ADD and SUB signals such that the second bit (H01M, G01M, H11M, and G11M) is set to one if the respective adder/subtractor S70A, S61A is set to add (ADD is high), and the second bit is set to its actual latch output value if the SUB signal is set to high. Setting of individual bits in this manner is an easily implemented, high-speed operation. The preferred embodiment includes this bit-forcing arrangement since, as is described above, statistical analysis of a large number of tests pixel words has indicated that more accurate results are thereby obtained. It is not necessary, however, to manipulate the second bits in this manner, although it gives the advantage of smaller word width.

The four high- or low-order results are latched in the output latches R70L R61L, R43L and R52L. The results are sequentially latched into the final output latch OUTF under the control of the multiplexing signals MUX_OUT70, MUX_OUT61, MUX_OUT43, MUX_OUT52. The order in which resulting signals are output can therefore be controlled simply by changing the sequence with which they are latched into the latch OUTF. The output from the latch OUTF is the final 22-bit resulting output signal T_OUT [21:0].

Figure 7B:
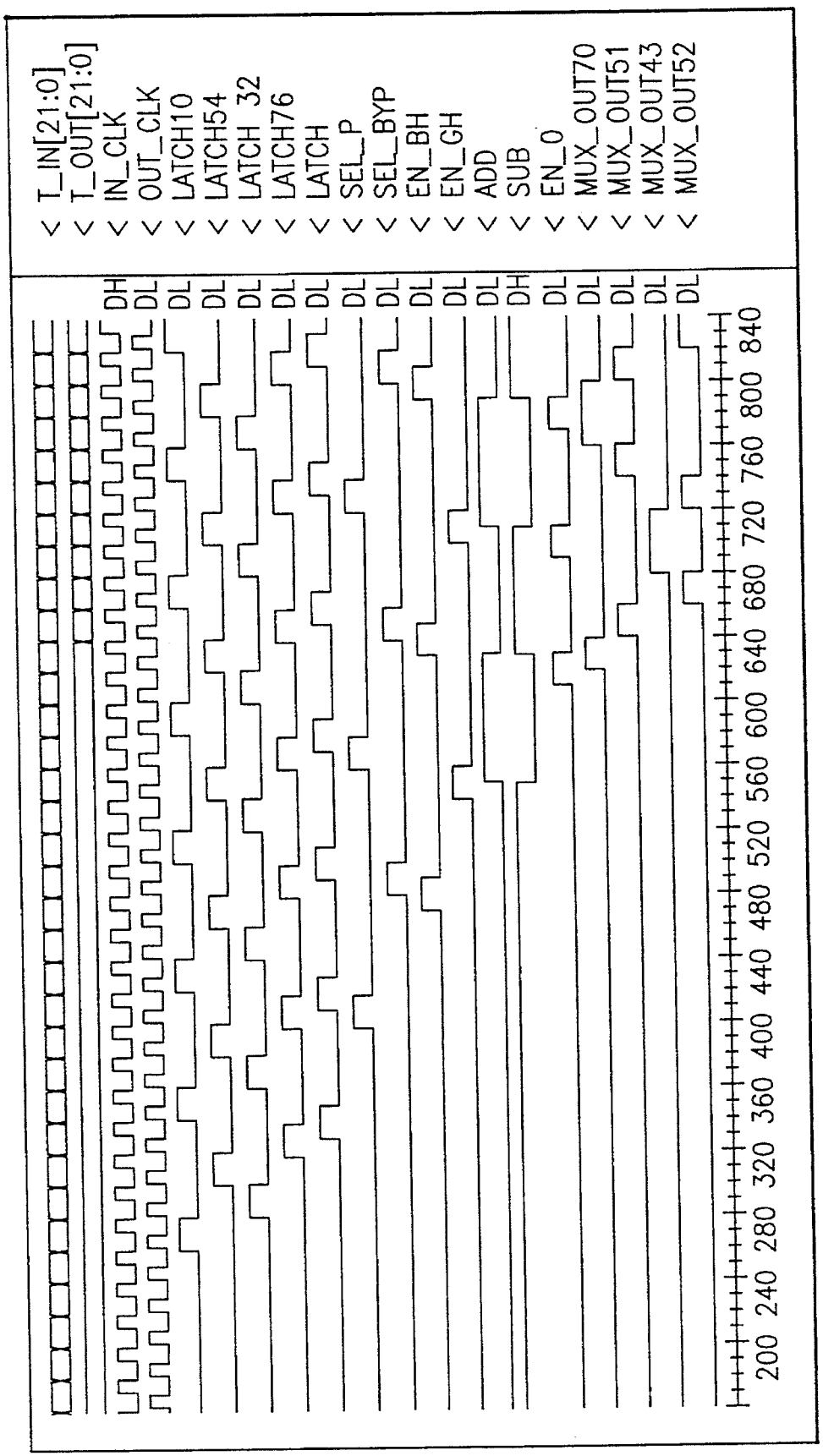
Figure 7C:
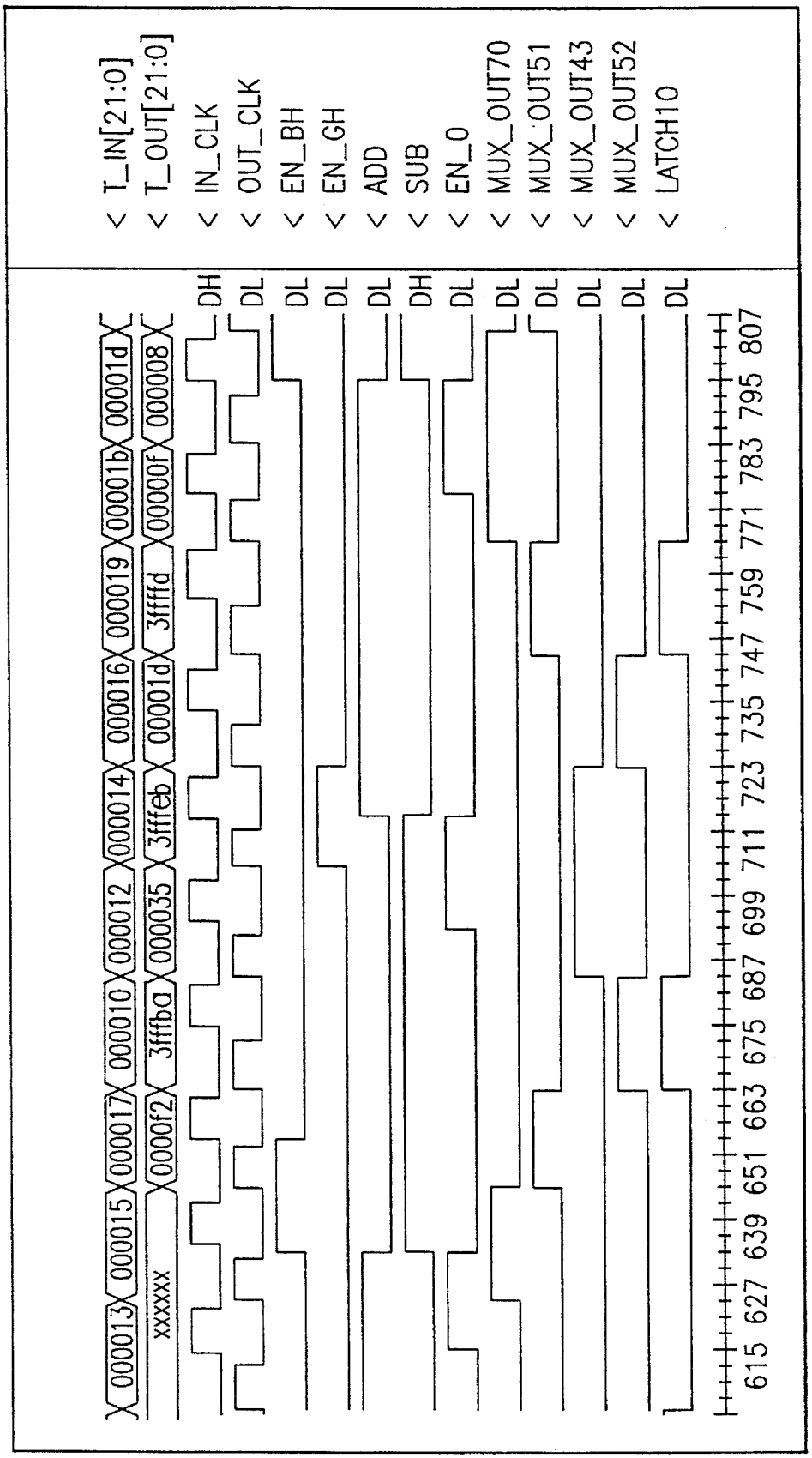

The relationship between the clock and control signals in the post-common block POSTC is shown in FIGS. 7b and 7c.

As was discussed above, two 1-dimensional IDCT operations may be performed in series, with an intervening transposition of data, in order to perform a 2-D IDCT. The output signals from the post-common block POSTC are herefore, according to this embodiment, first stored in a known manner column-wise (or row-wise) in a conventional storage unit, such as a RAM memory circuit (not shown), and are then read from the storage unit row-wise (column-wise) to be passed as inputs to a subsequent pre-common block and are processed as described above in this block, and in a common block CBLK and a post-common block POSTC.

Storing by row (column) and reading out by column (row) performs the required operation of transposing the data before the second 1-D IDCT. The output from the second 1-D POSTC will be the desired, 2-D IDCT results and can be scaled in a conventional manner by shifting to offset the scaling shifts carried out in the various processing blocks, In particular, a right shift by one position will perform the division by 2 necessary to offset the two $\sqrt{2}$ multiplications performed in the 1-D IDCT operations.

Depending on the application, this second IDCT structure (which is preferably identical to that shown FIG. 3) is preferably a separate semiconductor implementation. This avoids the decrease in speed that would arise if the same circuits were used for both transforms, although separate 1-D transform implementations are not necessary if the pixel-clock rate is slow enough that a single implementation of the circuit will be able to handle two passes in real time.

In range tests carried out on a prototype of the IDCT arrangement described above, it was found that all intermediate and final values were kept well within a known range at each point while still meeting the CCITT standards. Because of this, it was possible to "adjust" selected values as described above by small amounts (for example, by forcing certain bits of selected data words to desired values) without any fear of overflow or underflow in the arithmetic calculations.

The method and system according to the invention can be varied in numerous ways. For example, the structures used to resolve additions or multiplications may be altered using any known technology. Thus, it is possible to use resolving adders or subtractors where the preferred embodiment uses carry-save devices with separate resolving adders. Also, the preferred embodiment of the invention uses down-scaling at various points to ensure that all values remain within their acceptable ranges. Down-scaling is not necessary, however, because other precautions may be taken to avoid overflow or underflow.

In a prototype of the invention, certain bits of various data words were manipulated on the basis of a statistical analysis of test results of the system. Although these manipulations reduced the required word width within the system, the various intermediate values may of course be passed without bit manipulation. Furthermore, although only data words were bit-manipulated in the illustrated example of the invention, it is also possible to manipulate the bits of constant coefficients as well and evaluate the results under the CCITT standard. If a comparison of the results showed that it would be advantageous to force a particular bit to a given value, in some cases, one might then be able to increase the number of "zeros" in the binary representation of these coefficients in order to decrease further the silicon area required to implement the corresponding multiplier. Once again, bit manipulation is not necessary.

We claim:

1. A system for transforming digital signals from a frequency to a time representation, in which the digital signals are arranged in groups of N data input words, comprising:
    means for multiplying data input words by the square root of two to generate scaled input words;
    pre-common processing means (PREC) arranged to perform predetermined pairing operations on odd-numbered ones of the scaled input words and to transmit even-numbered ones of the scaled input words to pre-common outputs; and
    post-common processing means (POSTC) arranged to perform predetermined output scaling operations on the odd common processing means output values to form post-processed odd values and to arithmetically combine the post-processed odd values with the even common processing means output values to generate high- and low-order output words, the system being arranged such that the output words contain inverse discrete cosine transformation values corresponding to the input data words.

2. A system according to claim 1, wherein the pre-common processing means (PREC) has N/2 pre-common inputs and N/2 pre-common outputs, the common processing means (CBLK) has N/2 common inputs, which are connected to the N/2 pre-common outputs, and the N/2 common outputs and the post-common processing means (POSTC) has N/2 post-common inputs, which are connected to the N/2 common outputs, and N/2 post-common outputs, which form system outputs.

3. A system according to claim 1, wherein said pre-common processing means (PREC) and said post-common processing means (POSTC) have internal data words flowing therethrough, and further comprise means for forcing predetermined bits of selected internal data words to predetermined binary values, such that the statistical accuracy of the system is improved relative to a predetermined test input data set.

4. A system according to claim 2, and comprising means arranged to force predetermined bits of selected internal data words to predetermined binary values, such that the statistical accuracy of the system is improved relative to a predetermined test input data set.

5. A system according to any one of claims 1 to 3, wherein the pre-common means (PREC) includes a single scaling multiplier (R2MUL) attached in a lowest order input data line for multiplying the lowest order odd input data word by a pre-determined scaling factor.

6. A system according to claim 5, wherein the pre-common processing means (PREC) includes a plurality of adders (P1A, P2A, P3A) for pairwise addition of predetermined ones of the odd-numbered input data words to form paired input date words.

7. A system according to any one of claims 1 to 3, wherein the pre-common processing means (PREC) includes a plurality of adders (P1A, P2A, P3A) for pairwise addition of predetermined ones of the odd-numbered input data words to form paired input data words.

8. A system according to claim 7, wherein the adders (PIA, P2A, P3A) all are fixed-point devices.

9. A system according to any one of claims 1 to 3, wherein the pre-common processing means further includes a plurality of pre-common output storage elements (C1OL, C54L, C32L, C76L) arranged alternately to load and latch the paired input data words and the even input data words.

10. A system according to any one of claims 1 to 3, wherein the common processing means (CBLK) includes common coefficient multipliers (MULC1S, MULC3S3, MULC3S2, MULNC1S) for multiplying selected common processing means input values by predetermined trigonometric constants.

11. A system according to claim 10, wherein the common coefficient multipliers (MULC1S, MULC3S3, MULC3S2, MULNC1S) are four in number and are arranged such that each of a selected pair of the common processing means input values is connected to a corresponding pair of the four coefficient multipliers.

12. A system according to claim 11, wherein:
 a) the post-common processing means (POSTC) includes switchable arithmetic devices (S70A, S61A, S43A, S52A) each with an addition mode and a subtraction mode;
 b) the post-processed odd values and the even common outputs are connected as inputs to the switchable arithmetic devices (S70A, S61A, S43A, S52A);
 c) in the addition mode, the switchable arithmetic devices form the low-order output words as the sum of the post-processed odd values and -the even common outputs; and
 d) in the subtraction mode, the switchable arithmetic devices form the high-order output words as the difference of the post-processed odd values and the even common outputs.

13. A system according to claim 10, wherein the common coefficient multipliers (MULC1S, MULC3S3, MULC3S2, MULNC1S) all are fixed-point devices.

14. A system according to claim 10, wherein:
 a) the post-common processing means (POSTC) includes switchable arithmetic devices (S70A, S61A, S43A, S52A) each with an addition mode and a subtraction mode;
 b) the post-processed odd values and the even common outputs are connected as inputs to the switchable arithmetic devices (S70A, S61A, S43A, S52A);
 c) in the addition mode, the switchable arithmetic devices form the low-order output words as the sum of the post-processed odd values and -the even common outputs; and
 d) in the subtraction mode, the switchable arithmetic devices form the high-order output words as the difference of the post-processed odd values and the even common outputs.

15. A system according to claim 10, wherein the post-common processing means (POSTC) includes a plurality of post-common coefficient multipliers (dI, d3, d5, d7) arranged to multiply the odd common processing means output values respectively by predetermined post-common, constant, scaling values to form the post-processed odd values.

16. A system according to any one of claims 1 to 3, wherein:
 a) the post-common processing means (POSTC) includes switchable arithmetic devices (S70A, S61A, S43A, S52A) each with an addition mode and a subtraction mode;
 b) the post-processed odd values and the even common outputs are connected as inputs to the switchable arithmetic devices (S70A, S61A, S43A, S52A);
 c) in the addition mode, the switchable arithmetic devices form the low-order output words as the sum of the post-processed odd values and -the even common outputs; and
 d) in the subtraction mode, the switchable arithmetic devices form the high-order output words as the difference of the post-processed odd values and the even common outputs.

17. A system according to claim 16, further comprising control means (CNTL) connected to the switchable arithmetic devices (S70A, S61A, S43A, S52A) for generating mode signals to switch the arithmetic devices between the addition and subtraction modes.

18. A system according to claim 16, wherein the switchable arithmetic devices (S70A, S61A, S43A, S52A) all are fixed-point devices.

19. A system according to claim 16, wherein the post-common processing means (POSTC) includes a plurality of post-common coefficient multipliers (dI, d3, d5, d7) arranged to multiply the odd common processing means output values respectively by predetermined post-common, constant, scaling values to form the post-processed odd values.

20. A system according to claim 16, wherein the switchable arithmetic devices (S70A, S61A, S43A, S52A) are all fixed-point devices.

21. A system according to claim 16, wherein the common arithmetic devices (BT2, BT3, c1s, c3s) are all fixed-point devices.

22. A system according to claim 16, further comprising a plurality of adders (M5A, PIA, P2A, P3A, BT2, BT3, CSO, CS1, CS2, CS3, RESO, RES1, RES2, RES3, HOA, H1A, H2A, H3A) and adder/subtractors (S70A, S61A, S43A, S52A) all of which are fixed-point devices.

23. A system according to any one of claims 1 to 3, wherein the post-common processing means (POSTC) includes a plurality of post-common coefficient multipliers (dI, d3, d5, d7) arranged to multiply the odd common processing means output values respectively by predetermined post-common, constant, scaling values to form the post-processed odd values.

24. A system according to any one of claims 1 to 3, wherein the common processing means (CBLK) is a non-clocked, pure-logic circuit.

25. A system according to any one of claims 1 to 3, the common arithmetic devices (BT2, BT3, c1s, c3s) all being fixed-point devices.

26. A system according to any one of claims 1 to 3, further comprising a plurality of adders (M5A, PIA, P2A, P3A, BT2, BT3, CSO, CS1, CS2, CS3, RESO, RES1, RES2, RES3, HOA, H1A, H2A, H3A) and adder/subtractors (S70A, S61A, S43A, S52A) all of which are fixed-point devices.

27. A system according to any one of claims 1 to 3, wherein the pre-common processing means (PREC) includes a plurality of adders (P1A, P2A, P3A) for pairwise addition of predetermined ones of the odd-numbered input data words to form paired input data words, and the common processing means (CBLK) includes common coefficient multipliers (MULC1S, MULC3S3, MULC3S2, MULNC1S) for multiplying selected common processing means input values by predetermined trigonometric constants, the adders (PIA, P2A, P3A) all being fixed-point devices.

28. A system according to any one of claims 1 to 3, wherein the pre-common processing means (PREC) includes a plurality of adders (P1A, P2A, P3A) for pairwise addition of predetermined ones of the odd-numbered input data words to form paired input data words, the adders (PIA, P2A, P3A) all being fixed-point devices, and
 a) the post-common processing means (POSTC) includes switchable arithmetic devices (S70A, S61A, S43A, S52A) each with an addition mode and a subtraction mode;

b) the post-processed odd values and the even common outputs are connected as inputs to the switchable arithmetic devices (S70A, S61A, S43A, S52A);

c) in the addition mode, the switchable arithmetic devices form the low-order output words as the sum of the post-processed odd values and -the even common outputs; and d) in the subtraction mode, the switchable arithmetic devices form the high-order output words as the difference of the post-processed odd values and the even common outputs.

29. A system according to any one of claims 1 to 3, wherein the pre-common processing means (PREC) includes a plurality of adders (P1A, P2A, P3A) for pairwise addition of predetermined ones of the odd-numbered input data words to form paired input data words, the adders (PIA, P2A, P3A) all being fixed-point devices; and the common processing means (CBLK) is a non-clocked, pure-logic circuit.

30. A system according to any one of claims 1 to 3, wherein the common processing means (CBLK) includes common coefficient multipliers (MULC1S, MULC3S3, MULC3S2, MULNC1S) for multiplying selected common processing means input values by predetermined trigonometric constants, the common coefficient multipliers (MULC1S, MULC3S3, MULC3S2, MULNC1S) all being fixed-point devices, wherein:

a) the post-common processing means (POSTC) includes switchable arithmetic devices (S70A, S61A, S43A, S52A) each with an addition mode and a subtraction mode;

b) the post-processed odd values and the even common outputs are connected as inputs to the switchable arithmetic devices (S70A, S61A, S43A, S52A);

c) in the addition mode, the switchable arithmetic devices form the low-order output words as the sum of the post-processed odd values and -the even common outputs; and d) in the subtraction mode, the switchable arithmetic devices form the high-order output words as the difference of the post-processed odd values and the even common outputs.

31. A system according to any one of claims 1 to 3, wherein the pre-common processing means (PREC) includes a plurality of adders (P1A, P2A, P3A) for pairwise addition of predetermined ones of the odd-numbered input data words to form paired input date, the adders (PIA, P2A, P3A) all being fixed-point devices; wherein the common processing means (CBLK) includes common coefficient multipliers (MULC1S, MULC3S3, MULC3S2, MULNC1S) for multiplying selected common processing means input values by predetermined trigonometric constants, the common coefficient multipliers (MULC1S, MULC3S3, MULC3S2, MULNC1S) all being fixed-point devices.

32. A system according to claim 31, wherein the switchable arithmetic devices (S70A, S61A, S43A, S52A) are all fixed-point devices.

33. A system according to claim 32, wherein the common arithmetic devices (BT2, BT3, c1s, c3s) are all fixed-point devices.

34. A system according to claim 33, further comprising a plurality of adders (M5A, PIA, P2A, P3A, BT2, BT3, CSO, CS1, CS2, CS3, RESO, RES1, RES2, RES3, HOA, H1A, H2A, H3A) and adder/subtractors (S70A, S61A, S43A, S52A) all of which are fixed-point devices.

35. A system according to claim 31, wherein the common arithmetic devices (BT2, BT3, c1s, c3s) are all fixed-point devices.

36. A system according to claim 35, further comprising a plurality of adders (M5A, PIA, P2A, P3A, BT2, BT3, CSO, CS1, CS2, CS3, RESO, RES1, RES2, RES3, HOA, H1A, H2A, H3A) and adder/subtractors (S70A, S61A, S43A, S52A) all of which are fixed-point devices.

37. A system according to any of claims 1 to 3, wherein the common arithmetic devices (BT2, BT3, c1s, c3s) are all fixed-point devices.

38. A system according to any one of claims 1 to 3, further comprising a plurality of adders (M5A, PIA, P2A, P3A, BT2, BT3, CSO, CS1, CS2, CS3, RESO, RES1, RES2, RES3, HOA, H1A, H2A, H3A) and adder/subtractors (S70A, S61A, S43A, S52A) all of which are fixed-point devices.

39. A method for transforming digital signals from a frequency to a time representation, including grouping the digital signals into groups of N data input words; CHARACTERIZED by the following steps:

in a pre-common processing means (PREC) performing predetermined pairing operations on odd-numbered ones of the input words and transmitting even-numbered ones of the input words to the pre-common outputs; and passing both odd- and even-numbered input data words in separate passes through a common processing means (CBLK) to form odd and even common processing means output values, respectively;

the method being such that the output values contain inverse discrete cosine transformation values corresponding to the input data words.

40. A method for transforming digital signals from a frequency to a time representation, including grouping the digital signals into groups of N data input words; CHARACTERIZED by the following steps:

passing both odd- and even-numbered input data words in separate passes through a common processing means (CBLK) to form odd and even common processing means output values, respectively; and in a post-common processing means (POSTC), performing predetermined output scaling operations on the odd common means output values to form post-processed odd values and arithmetically combining the post-processed odd values with the even common means outputs to generate high- and low-order output words;

the method being such that the output words contain inverse discrete cosine transformation values corresponding to the input data words.

41. The method according to claim 39 or claim 40, further comprising the step of multiplying the input words by the square root of two.

* * * * *

UNITED STATES PATENT AND TRADEMARK OFFICE
CERTIFICATE OF CORRECTION

PATENT NO. : 5,596,517
DATED : January 21, 1997
INVENTOR(S) : Anthony M. Jones, et al.

It is certified that error appears in the above-identified patent and that said Letters Patent is hereby corrected as shown below:

Col. 7, line 34, insert --jπ-- between "(2m + 1)" and "]".

Col. 9, line 2, delete -- √22· -- between "of" and "√2" and insert -- √2· --.

Col. 11, line 49, delete --+-- between "(y3 + y5)" and "(y5 + y7)" and insert -- - --.

Col. 11, line 51, delete --+-- between "{y1" and "(y1" and insert -- - --.

Col. 11, line 51, delete --+-- after "c3" and insert -- - --.

Col. 11, line 52, delete -- - -- between "c2" and "(y5" and insert --+--.

Col. 11, line 54, delete --+-- between "y1" and "(y1" and insert -- - --.

Col. 11, line 54, delete --+-- after "c3s" and insert -- - --.

Col. 11, line 57, delete --+-- between "{y1" and "(y1" and insert -- - --.

Col. 11, line 58, delete --+-- between "c2" and "(y5" and insert -- - --.

Col. 11, line 60, delete --+-- between "y1" and "(y1" and insert -- - --.

Col. 11, line 61, delete --+-- between "y5)" and "(y5" and insert -- - --.

Col. 12, line 17, delete --+-- between "y1" and "(y1" and insert -- - --.

Col. 12, line 19, delete -- - -- between "y5)" and "(y5" and insert --+--.

Col. 12, line 21, delete --+-- between "y1" and "(y1" and insert -- - --.

UNITED STATES PATENT AND TRADEMARK OFFICE
CERTIFICATE OF CORRECTION

PATENT NO. : 5,596,517
DATED : January 21, 1997
INVENTOR(S) : Anthony M. Jones, et al.

It is certified that error appears in the above-identified patent and that said Letters Patent is hereby corrected as shown below:

Col. 12, line 21, delete -- - -- after "cls" and insert -- + --.

Col. 12, line 42, delete --;-- after "(E13)" and insert -- : --.

Col. 12, line 44, delete --;-- after "Then" and insert -- : --.

Col. 12, line 48, delete --;-- after "(E14)" and insert -- : --.

The following patents cited by applicant were not listed on the first page of the issued patent:

| PATENT NUMBER | ISSUE Date | PATENTEE | CLASS | SUBCLASS |
|---|---|---|---|---|
| 5,257,213 | 10/93 | Kim et al | 364 | 725 |
| 5,345,408 | 9/94 | Hoogenboom | 364 | 725 |
| 4,849,922 | 7/89 | Riolfo | 364 | 725 |

Signed and Sealed this

Thirty-first Day of March, 1998

Attest:

BRUCE LEHMAN

*Attesting Officer*  *Commissioner of Patents and Trademarks*